(12) United States Patent
Aikawa et al.

(10) Patent No.: US 7,285,159 B2
(45) Date of Patent: Oct. 23, 2007

(54) INK JET INK, INK SET, INK JET RECORDING METHOD, INK CARTRIDGE, RECORDING UNIT, AND INK JET RECORDING APPARATUS

(75) Inventors: Yoshihide Aikawa, Kanagawa (JP); Kuniaki Fujimoto, Tokyo (JP); Shin-ichi Sato, Kanagawa (JP); Jun Yoshizawa, Tokyo (JP); Kunihiko Nakamura, Shizuoka (JP); Masanori Jinnou, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/322,128

(22) Filed: Dec. 30, 2005

(65) Prior Publication Data

US 2006/0103706 A1    May 18, 2006

Related U.S. Application Data

(63) Continuation of application No. PCT/JP2005/012711, filed on Jul. 4, 2005.

(30) Foreign Application Priority Data

| Jul. 2, 2004 | (JP) | ............................. 2004-196452 |
| Jun. 30, 2005 | (JP) | ............................. 2005-192192 |

(51) Int. Cl.
C09D 11/02 (2006.01)
B41J 2/01 (2006.01)

(52) U.S. Cl. .................... 106/31.47; 347/100

(58) Field of Classification Search ............. 106/31.47; 347/100
See application file for complete search history.

(56) References Cited

U.S. PATENT DOCUMENTS 3,400,121 A * 9/1968 Weckler et al. ............. 544/197

(Continued)

FOREIGN PATENT DOCUMENTS

EP    1626069    *  2/2006

(Continued)

*Primary Examiner*—Helene Klemanski
(74) *Attorney, Agent, or Firm*—Fitzpatrick, Cella, Harper & Scinto

(57) ABSTRACT

Provided is an ink jet ink comprising at least a coloring material comprising a compound represented by the general formula (I) or a salt thereof; and a compound represented by the general formula (II). Thereby, there can be provided an ink jet ink that provides image quality comparable to silver halide photograph and provides a recorded article having high light fastness General formula (I)

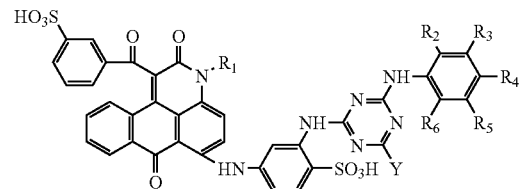

General formula (II)

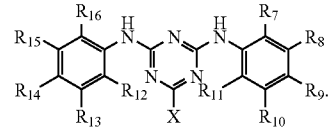

15 Claims, 15 Drawing Sheets

U.S. PATENT DOCUMENTS

| | | | | |
|---|---|---|---|---|
| 3,697,520 | A | * | 10/1972 | Winter ........................ 544/196 |
| 4,183,929 | A | * | 1/1980 | Conrow et al. ............. 514/245 |
| 4,202,870 | A | | 5/1980 | Weber et al. ................ 423/630 |
| 4,242,271 | A | | 12/1980 | Weber et al. ......... 360/448 AD |
| 4,248,852 | A | | 2/1981 | Wakabayashi et al. ...... 423/626 |
| 4,617,390 | A | * | 10/1986 | Hoppe et al. ................ 544/197 |
| 4,723,129 | A | | 2/1988 | Endo et al. ................... 346/1.1 |
| 4,740,796 | A | | 4/1988 | Endo et al. ................... 346/1.1 |
| 5,096,489 | A | * | 3/1992 | Laver ...................... 106/31.47 |
| 5,395,434 | A | | 3/1995 | Tochihara et al. ........ 106/22 R |
| 5,415,686 | A | | 5/1995 | Kurabayashi et al. ..... 106/26 R |
| 5,451,251 | A | | 9/1995 | Mafune et al. ........... 106/22 H |
| 5,482,545 | A | | 1/1996 | Aoki et al. ................ 106/22 K |
| 5,485,188 | A | | 1/1996 | Tochihara et al. .......... 374/100 |
| 5,835,116 | A | | 11/1998 | Sato et al. ..................... 347/98 |
| 5,933,164 | A | | 8/1999 | Sato et al. ..................... 347/43 |
| 6,003,987 | A | | 12/1999 | Yamamoto et al. ......... 347/100 |
| 6,027,210 | A | | 2/2000 | Kurabayashi et al. ....... 347/100 |
| 6,143,060 | A | * | 11/2000 | Fujii et al. ................ 106/31.47 |
| 6,186,615 | B1 | | 2/2001 | Sato et al. ..................... 347/43 |
| 6,193,960 | B1 | * | 2/2001 | Metzger et al. ............... 424/59 |
| 6,238,045 | B1 | | 5/2001 | Ono et al. ..................... 347/96 |
| 6,254,669 | B1 | | 7/2001 | Lavery et al. ........... 106/31.47 |
| 6,322,209 | B1 | | 11/2001 | Sato et al. .................. 347/105 |
| 6,471,760 | B1 | | 10/2002 | Matsumoto et al. ..... 106/31.47 |
| 6,508,872 | B2 | * | 1/2003 | Nguyen et al. .......... 106/31.47 |
| 6,511,534 | B1 | | 1/2003 | Mishina et al. .......... 106/31.33 |
| 6,698,876 | B2 | | 3/2004 | Sato et al. .................. 347/100 |
| 6,929,361 | B2 | | 8/2005 | Matsumoto et al. ........ 347/100 |
| 6,976,755 | B2 | | 12/2005 | Sato et al. .................. 347/100 |
| 7,015,327 | B2 | | 3/2006 | Matsumoto et al. .......... 546/76 |
| 7,144,452 | B2 | | 12/2006 | Takayama et al. ........ 106/31.52 |
| 7,160,372 | B2 | | 1/2007 | Yoshizawa et al. ...... 106/31.47 |
| 2003/0116059 | A1 | * | 6/2003 | Nguyen et al. .......... 106/31.47 |
| 2004/0174420 | A1 | | 9/2004 | Ktamura et al. ............. 374/100 |
| 2004/0239739 | A1 | | 12/2004 | Matsumoto et al. ........ 347/100 |
| 2005/0005818 | A1 | | 1/2005 | Sato et al. ................ 106/31.27 |
| 2005/0131104 | A1 | | 6/2005 | Aikawa et al. ............. 523/160 |
| 2005/0171351 | A1 | | 8/2005 | Matsumoto et al. .......... 546/76 |
| 2006/0102046 | A1 | | 5/2006 | Okamura et al. ........ 106/31.47 |
| 2006/0102048 | A1 | | 5/2006 | Nakamura et al. ....... 106/31.52 |
| 2006/0103705 | A1 | | 5/2006 | Yoshizawa et al. ......... 347/100 |
| 2006/0109324 | A1 | * | 5/2006 | Fujimoto et al. ............ 347/100 |
| 2006/0119683 | A1 | | 6/2006 | Yoahizawa et al. ......... 347/100 |
| 2006/0119685 | A1 | | 6/2006 | Yamashita et al. .......... 347/100 |
| 2006/0124027 | A1 | | 6/2006 | Sato ........................ 106/31.6 |
| 2006/0125896 | A1 | | 6/2006 | Aikawa et al. ............. 347/100 |
| 2006/0146108 | A1 | | 7/2006 | Sato et al. .................. 347/100 |
| 2006/0152569 | A1 | | 7/2006 | Jinnou et al. ............... 347/105 |
| 2006/0219131 | A1 | * | 10/2006 | Matsumoto et al. ..... 106/31.47 |
| 2007/0062413 | A1 | * | 3/2007 | Matsumoto et al. ..... 106/31.47 |

FOREIGN PATENT DOCUMENTS

| | | |
|---|---|---|
| JP | 57-44605 | 9/1982 |
| JP | 2803134 | 7/1998 |
| JP | 2881847 | 2/1999 |
| JP | 2000-109464 | 4/2000 |
| JP | 2001-517209 | 10/2001 |
| JP | 2002-332419 | 11/2002 |
| JP | 2003-192930 | 7/2003 |
| JP | 2004-91632 | 3/2004 |
| JP | WO 2004/104107 A1 | 12/2004 |
| JP | 2005-8868 | 1/2005 |
| WO | WO 02/30913 A1 | 4/2002 |
| WO | WO 2004/104108 A1 | 12/2004 |

* cited by examiner

INK JET INK, INK SET, INK JET RECORDING METHOD, INK CARTRIDGE, RECORDING UNIT, AND INK JET RECORDING APPARATUS

This application is a continuation of International Application No. PCT/JP2005/012711, filed Jul. 4, 2005, which claims the benefit of Japanese Patent Application Nos. 2004-196452, filed Jul. 2, 2004 and 2005-192192, filed Jun. 30, 2005.

BACKGROUND OF THE INVENTION

1. Field of the Invention

The present invention relates to an ink jet ink that provides an image excellent in light fastness and the like, an ink set, an ink jet recording method, an ink cartridge, a recording unit, and an ink jet recording apparatus.

2. Related Background Art

An ink jet recording method is a recording method involving applying a small ink droplet to any one of recording media such as plain paper and glossy media to form an image, and has become rapidly widespread owing to a reduction in its cost and an improvement in its recording speed. With the rapid spread of a digital camera in addition to an improvement in image quality of a recorded article by this method, an ink jet printer has been required to output a recorded article comparable to silver halide photograph.

For example, a recorded article obtained by means of an ink jet recording method must have high fastness properties so as to be comparable to silver halide photograph. A conventional ink jet recorded article has low fastness properties as compared to silver halide photograph. Therefore, the following problems have been posed. When the recorded article is exposed to, for example, light, humidity, heat, and an environmental gas present in the air for a long time period, a coloring material present in the recorded article is apt to deteriorate to thereby cause the color tone change and color fading of an image. That is, the fastness properties are low. A number of studies have been hitherto made to solve such problems as described above.

For example, there has been proposed the use of a coloring material having an anthrapyridone structure to improve fastness properties (see, for example, Japanese Patent Application Laid-open Nos. 2002-332419 and 2003-192930). The use of the coloring material can improve the storage stability of ink jet ink. However, at present, the storage stability of a recorded article obtained by means of conventional ink jet ink typified by such ink has not been comparable to that of silver halide photograph.

In recent years, a recording medium using an inorganic substance such as alumina or silica for an ink-receiving material has been used as an ink jet recording medium in order to obtain an image comparable or superior to silver halide photograph. However, the light fastness of a recorded article obtained by performing recording on such recording medium as described above cannot be said to be sufficient. Such recorded article undergoes color fading in a shorter time period than that in the case of silver halide photograph when the recorded article is stored in an environment in which the recorded article is irradiated with light.

SUMMARY OF THE INVENTION

In view of the above-described problems, the present inventors have made extensive studies. They have made studies by using a coloring material having higher light fastness than that of a conventional coloring material and by paying attention to the addition of an additive for improving light fastness to ink. When a coloring material having high light fastness is used and an additive has a function of improving light fastness, the life of a recorded article is expected to considerably lengthen and the light fastness of the recorded article is expected to be comparable to that of silver halide photograph.

The inventors have studied the additives to be commonly used for ink to find the following. Any one of the additives has an insufficient improving effect on light fastness. In addition, an additive itself has a unique color tone. Therefore, the color tone of a recorded article created by means of ink containing the additive may change.

In light of the foregoing, the inventors of the present invention have made further studies to find the basic technical concept of the present invention. That is, the inventors have found the conditions under which a recorded article can have high light fastness (a first task) by using a coloring material and an additive conforming to the properties of the coloring material in combination. The inventors have also found the conditions under which at least one of: making good the ink stability at the time of storage at a low temperature (a second task); making good the initial ejection property immediately after printing (a third task); making the image quality good (a fourth task); and making the printing continuability good (a fifth task) can be satisfied on the basis of the correlation between the pH of ink and the amount of the additive to be added.

Therefore, a first object according to the first task of the present invention is to provide an ink jet ink that provides image quality comparable to silver halide photograph and provides a recorded article having high light fastness.

A second object according to the second task of the present invention is to provide an ink jet ink capable of striking a balance between high light fastness of a recorded article and ink stability at the time of storage at a low temperature.

A third object according to the third task of the present invention is to provide an ink jet ink capable of striking a balance between high light fastness of a recorded article and initial ejection property immediately after printing.

A fourth object according to the fourth task of the present invention is to provide an ink jet ink capable of striking a balance between high light fastness of a recorded article and high image quality.

A fifth object according to the fifth task of the present invention is to provide an ink jet ink capable of striking a balance between high light fastness of a recorded article and high printing continuability.

Another objects of the present invention are to provide an ink set, an ink jet recording method, an ink cartridge, a recording unit, and an ink jet recording apparatus each using the ink jet ink.

The above objects are achieved by the present invention described below. That is, according to a first aspect according to the first task of the present invention, there is provided an ink jet ink comprising at least a coloring material comprising a compound represented by the general formula (I) or a salt thereof and a compound represented by the general formula (II).

General formula (I)

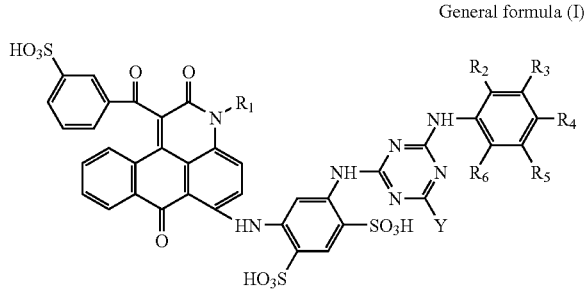

(In the general formula (I): $R_1$ represents a hydrogen atom, an alkyl group, a hydroxy lower alkyl group, a cyclohexyl group, a monoalkylaminoalkyl or dialkylaminoalkyl group, or a cyano lower alkyl group; and Y represents a chlorine atom, a hydroxyl group, an amino group, or a monoalkylamino or dialkylamino group which may have a substituent selected from the group consisting of a sulfonic group, a carboxyl group, and a hydroxyl group on an alkyl group; and $R_2$, $R_3$, $R_4$, $R_5$, and $R_6$ each independently represent a hydrogen atom, an alkyl group having 1 to 8 carbon atoms, or a carboxyl group provided that $R_2$, $R_3$, $R_4$, $R_5$, and $R_6$ cannot simultaneously represent hydrogen atoms.)

General formula (II)

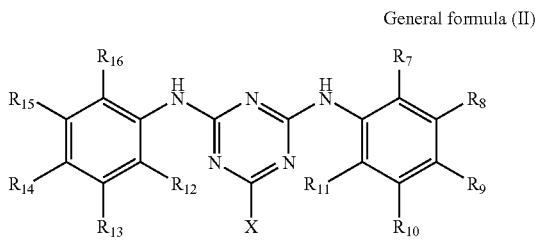

(In the general formula (II): $R_7$, $R_8$, $R_9$, $R_{10}$, $R_{11}$, $R_{12}$, $R_{13}$, $R_{14}$, $R_{15}$, and $R_{16}$ each independently represent a hydrogen atom, an alkyl group having 1 to 8 carbon atoms, or a carboxyl group or a salt thereof provided that $R_7$, $R_8$, $R_9$, $R_{10}$, $R_{11}$, $R_{12}$, $R_{13}$, $R_{14}$, $R_{15}$, and $R_{16}$ cannot simultaneously represent hydrogen atoms, and at least one of $R_7$, $R_8$, $R_9$, $R_{10}$, $R_{11}$, $R_{12}$, $R_{13}$, $R_{14}$, $R_{15}$, and $R_{16}$ represents a carboxyl group or a salt thereof; and X represents a chlorine atom, a hydroxyl group, an amino group, or a monoalkylamino or dialkylamino group which may have a substituent selected from the group consisting of a sulfonic group, a carboxyl group, and a hydroxyl group on an alkyl group.)

According to a second aspect according to the second task of the present invention, there is provided an ink jet ink having the above constitution, characterized in that the ink jet ink has a pH of 4.0 or more and 11.0 or less at 25° C., and in which the pH and the content (mass %) of the compound represented by the general formula (II) with respect to the total mass of the ink jet ink satisfy any one of the following relationships (a) to (k):

(a) When the pH is 10.5 or more and 11.0 or less, the content is 2.10 mass % or less;
(b) When the pH is 10.0 or more and less than 10.5, the content is 1.50 mass % or less;
(c) When the pH is 9.0 or more and less than 10.0, the content is 1.00 mass % or less;
(d) When the pH is 8.0 or more and less than 9.0, the content is 0.62 mass % or less;
(e) When the pH is 7.2 or more and less than 8.0, the content is 0.38 mass % or less;
(f) When the pH is 7.0 or more and less than 7.2, the content is 0.23 mass % or less;
(g) When the pH is 6.5 or more and less than 7.0, the content is 0.18 mass % or less;
(h) When the pH is 6.0 or more and less than 6.5, the content is 0.14 mass % or less;
(i) When the pH is 5.2 or more and less than 6.0, the content is 0.09 mass % or less;
(j) When the pH is 5.0 or more and less than 5.2, the content is 0.06 mass % or less; and
(k) When the pH is 4.0 or more and less than 5.0, the content is 0.04 mass % or less.

According to a third aspect according to the third task of the present invention, there is provided an ink jet ink having the above constitution, characterized in that a pH of the ink jet ink at 25° C. and a content (mass %) of the compound represented by the general formula (II) with respect to a total mass of the ink jet ink satisfy the following relational equation (1):

(Content (mass %) of compound represented by general formula (II)) $\leq 0.00015 \times (\text{pH of ink})^{4.05}$ in which the pH is 4.0 or more and 11.0 or less, and the content of the compound represented by the general formula (II) is 2.00 mass % or less.

According to a fourth aspect according to the fourth task of the present invention, there is provided an ink jet ink having the above constitution, characterized in that the pH of the ink jet ink at 25° C. and the content of the compound represented by the general formula (II) satisfy the relational equation (1) and the content of the compound represented by the general formula (II) is 0.42 mass % or less.

According to a fifth aspect according to the fifth problem of the present invention, there is provided an ink jet ink having the above constitution, characterized in that the ink jet ink has a pH of 6.0 or more and 9.5 or less at 25° C., and in which the pH and the content (mass %) of the compound represented by the general formula (II) with respect to the total mass of the ink jet ink satisfy any one of the following relationships (l) to (p):

(l) When the pH is 9.0 or more and 9.5 or less, the content is 0.23 mass % or less;
(m) When the pH is 8.3 or more and less than 9.0, the content is 0.18 mass % or less;
(n) When the pH is 7.0 or more and less than 8.3, the content is 0.11 mass % or less;
(o) When the pH is 6.5 or more and less than 7.0, the content is 0.09 mass % or less; and
(p) When the pH is 6.0 or more and less than 6.5, the content is 0.04 mass % or less.

According to another aspect of the present invention, there is provided an ink set consisting of a plurality of inks, in which the ink set includes the ink jet ink having the above constitution as a magenta ink.

According to still another aspect of the present invention, there is provided an ink jet recording method, comprising ejecting an ink by an ink jet method, in which the ink is the ink jet ink having the above constitution.

According to yet another aspect of the present invention, there is provided an ink cartridge, including an ink storage portion for storing ink, in which the ink is the ink jet ink having the above constitution.

According to yet still another aspect of the present invention, there is provided a recording unit, comprising an ink storage portion for storing ink and a recording head for ejecting the ink, in which the ink is the ink jet ink having the above constitution.

According to yet another aspect of the present invention, there is provided an ink jet recording apparatus, comprising an ink storage portion for storing ink and a recording head for ejecting the ink, in which the ink is the ink jet ink having the above constitution.

According to still another aspect of the present invention, there is provided an ink comprising a coloring material having a main color-developing structure portion and an auxiliary structure portion bonded to the main color-developing structure portion; and a compound comprising a main skeleton similar in structure to the auxiliary structure portion of the coloring material and a carboxyl group and having no absorption region in a visible region.

According to the first aspect according to the first task of the present invention, there can be provided an ink jet ink that provides image quality comparable to silver halide photograph and provides a recorded article having high light fastness.

According to the second aspect according to the second task of the present invention, there can be provided an ink jet ink capable of striking a balance between high light fastness of a recorded article and ink stability at the time of storage at a low temperature.

According to the third aspect according to the third task of the present invention, there can be provided an ink jet ink capable of striking a balance between high light fastness of a recorded article and initial ejection property immediately after printing.

According to the fourth aspect according to the fourth task of the present invention, there can be provided an ink jet ink capable of striking a balance between high light fastness of a recorded article and high image quality.

According to the fifth aspect according to the fifth task of the present invention, there can be provided an ink jet ink capable of striking a balance between high light fastness of a recorded article and high printing continuability.

According to other aspects of the present invention, there can also be provided an ink set, an ink jet recording method, an ink cartridge, a recording unit, and an ink jet recording apparatus each using the ink jet ink.

DESCRIPTION OF THE PREFERRED EMBODIMENTS

Figure 1:
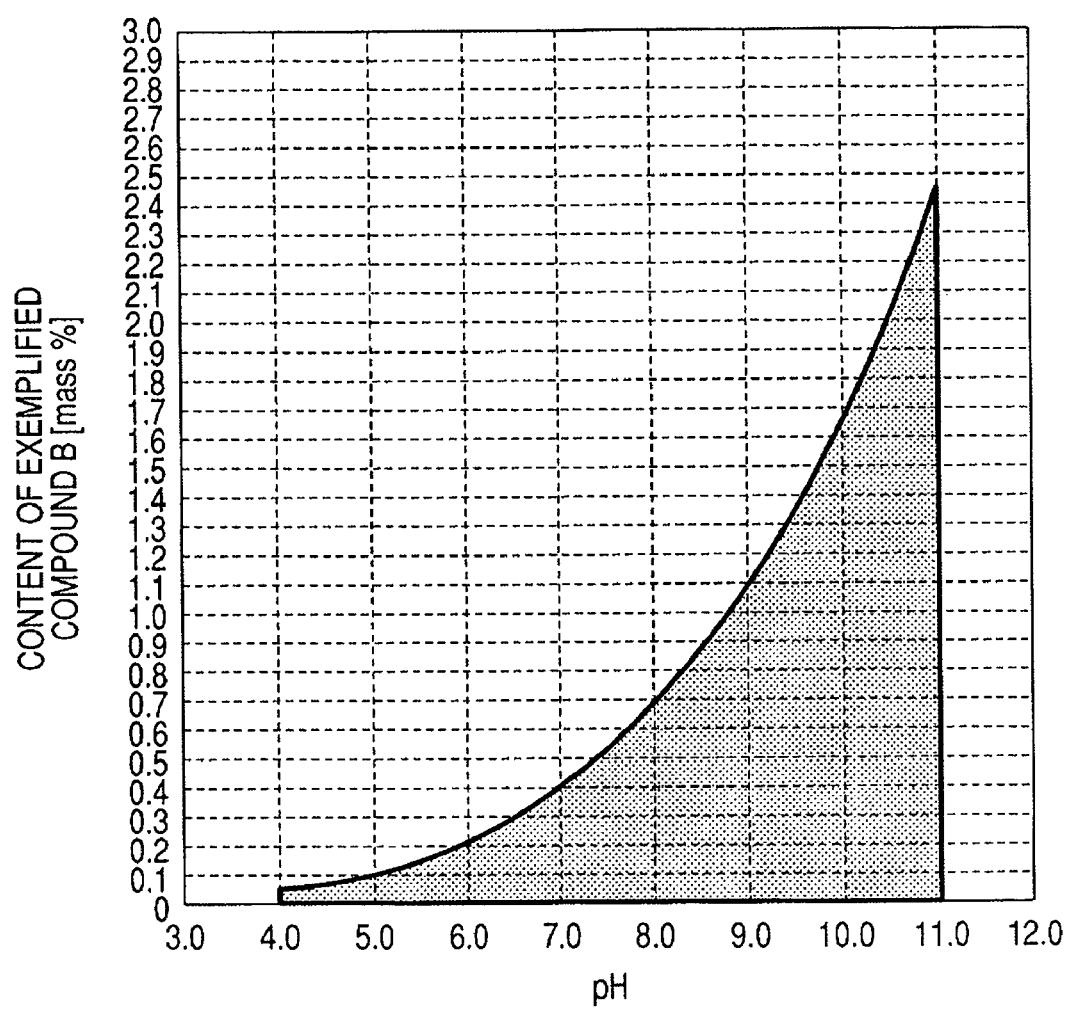
FIG. 1 is a graphical representation having an axis of ordinate indicating the content (mass %) of Exemplified Compound B and an axis of abscissa indicating the pH of ink at 25° C., showing a range in which a compound represented by the general formula (II) does not precipitate even when the ink is stored for a long time period and performance suitable for ink jet ink can be obtained.

Hereinafter, the present invention will be described in more detail by way of preferred embodiments.

The present invention exerts effects on general ink and general recording by means of the ink. The present invention is particularly preferably used as ink jet ink because its effects are most effectively exerted. Hereinafter, the case where the ink of the present invention is used as ink jet ink will be described.

In the present invention, when a compound is a salt, the salt is dissociated into ions in ink, but this state is represented by using the phrase "contains a salt" for convenience.

<Ink>

As a result of extensive studies, the present inventors have found that a recorded article obtained by means of ink containing: a compound represented by the general formula (I) or a salt thereof; and a compound represented by the general formula (II) has higher light fastness than that of a recorded article obtained by means of ink that does not contain any compound represented by the general formula (II).

The reason why the combined use of the compound represented by the general formula (I) or the salt thereof and the compound represented by the general formula (II) improves light fastness is considered to be as follows. After an ink droplet has arrived at a recording medium, the water content in ink reduces, or the pH of the ink becomes an acidic one, so that the compound represented by the general formula (II) having a carboxyl group in its molecule is precipitated in the vicinity of the surface of the recording medium. In addition, the compound represented by the general formula (II) suppresses, for example, the decomposition of the compound represented by the general formula (I) or the salt thereof. In other words, the compound represented by the general formula (II) serves to protect the compound represented by the general formula (I) or the salt thereof, thereby improving the light fastness of a recorded article.

Furthermore, it is believed that the compound represented by the general formula (II) has nearly no effect on the color tone of the recorded article because the compound shows nearly no absorption in a visible region. In addition, the molecular structure of the compound represented by the general formula (II) is partly similar to that of the compound represented by the general formula (I) or the salt thereof. Therefore, it is believed that even when the compound represented by the general formula (I) or the salt thereof and the compound represented by the general formula (II) coexist with each other, ink having good storage stability and good ink jet property is obtained because the affinity between the both compounds in the ink is high.

(Colorant)

[Compound Represented by General Formula (I) or a Salt Thereof]

The ink jet ink (hereinafter, sometimes simply referred to as "ink") in accordance with the present invention contains, as a coloring material, a compound represented by the following general formula (I) or a salt thereof as an essential component.

General formula (I)

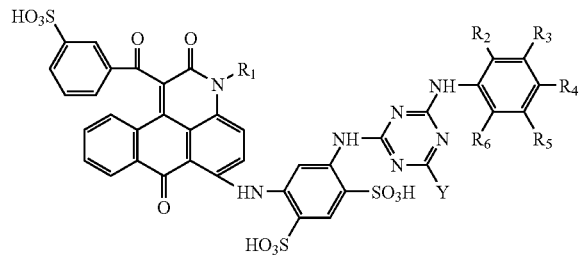

(In the general formula (I): $R_1$ represents a hydrogen atom, an alkyl group, a hydroxy lower alkyl group, a cyclohexyl group, a monoalkylaminoalkyl or dialkylaminoalkyl group, or a cyano lower alkyl group; and Y represents a chlorine atom, a hydroxyl group, an amino group, or a monoalkylamino or dialkylamino group which may have a substituent selected from the group consisting of a sulfonic group, a carboxyl group, and a hydroxyl group on an alkyl group; and $R_2$, $R_3$, $R_4$, $R_5$, and $R_6$ each independently represent a hydrogen atom, an alkyl group having 1 to 8 carbon atoms, or a carboxyl group provided that $R_2$, $R_3$, $R_4$, $R_5$, and $R_6$ cannot simultaneously represent hydrogen atoms.

In the present invention, the use of ink containing the compound represented by the general formula (I) or the salt thereof provides, for example, light fastness which is superior to a recorded article obtained by means of ink containing a conventional coloring material.

Exemplified Compounds 1 to 7 below are preferable examples of the compound represented by the general formula (I) or the salt thereof. Of course, the present invention is not limited to the following compounds. All the solubilizing groups in the following exemplified compounds are represented in H forms, but may form salts.

Exemplified Compounds 1 to 7

Exemplified compound 1

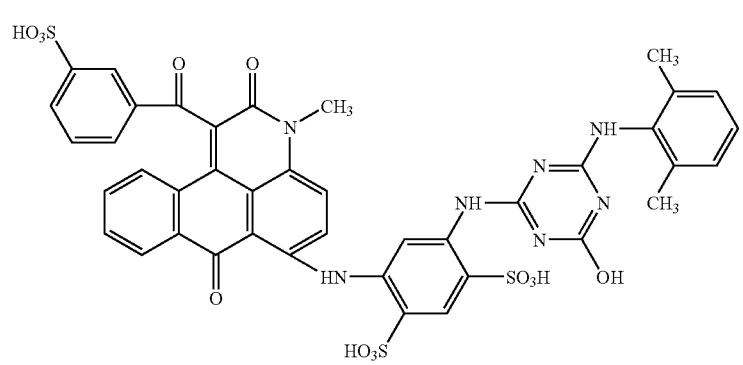

Exemplified compound 2

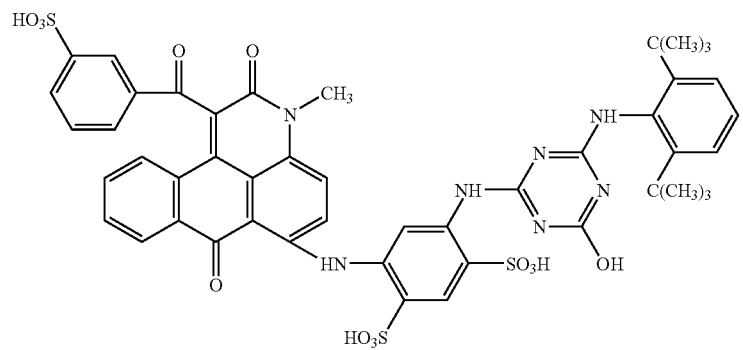

-continued
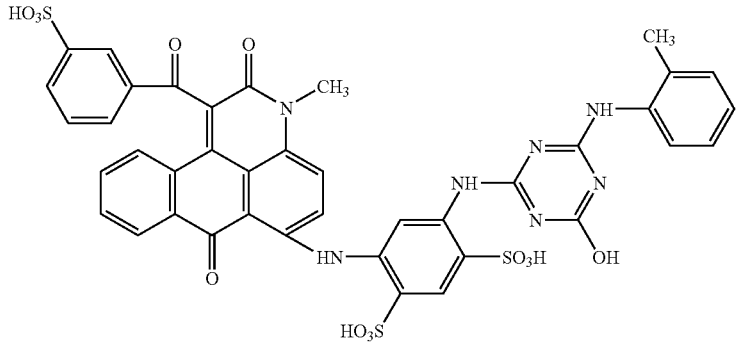
Exemplified compound 3
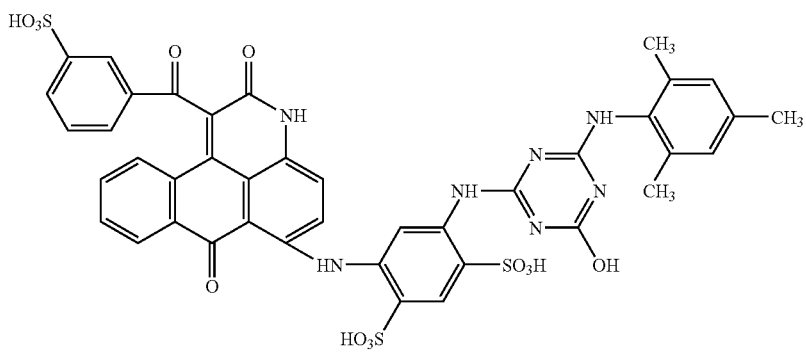
Exemplified compound 4
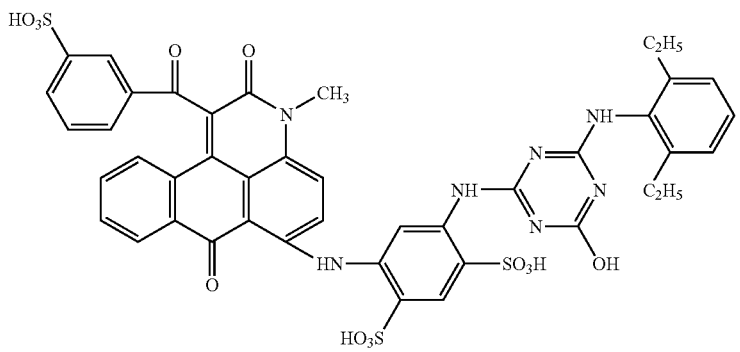
Exemplified compound 5
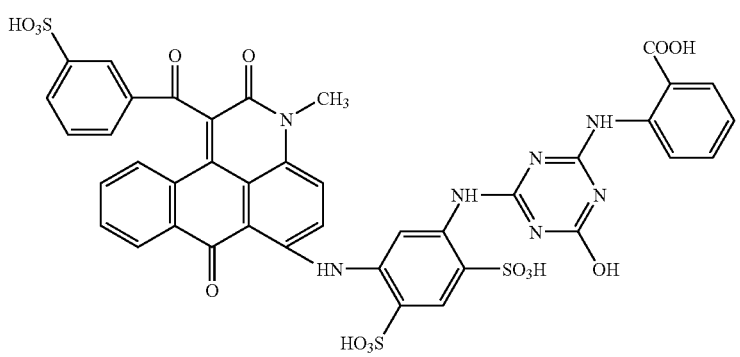
Exemplified compound 6

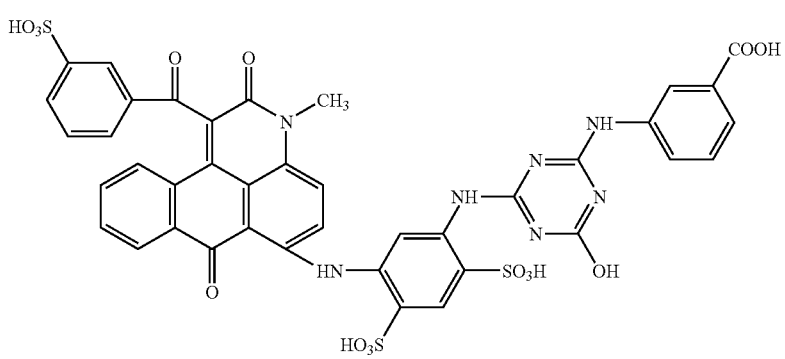

Exemplified compound 7

Exemplified Compound A below which is a sodium salt of Exemplified Compound 6 out of the above exemplified compounds is particularly preferably used.

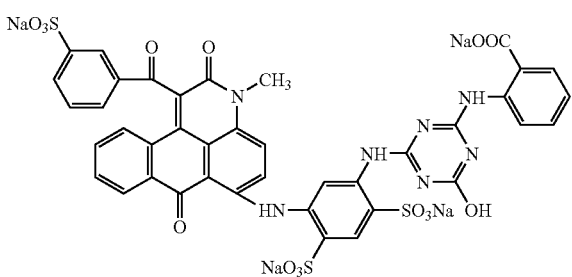

Exemplified Compound A

The content (mass %) of the compound represented by the general formula (I) or the salt thereof is preferably 0.1 mass % or more and 10.0 mass % or less with respect to the total mass of ink. A content of less than 0.1 mass % may be unable to provide a sufficient image density. A content in excess of 10.0 mass % may be unable to provide good ink jet property (for example, sticking recovery property of a nozzle portion of a recording head for ejecting ink may not be obtained). The content is preferably 3.0 mass % or more and 10.0 mass % or less in order to achieve a high image density, and the content is preferably 4.5 mass % or more and 10.0 mass % or less in order to achieve a higher image density.

When the ink in accordance with the present invention is used as deep-color ink having a high coloring material concentration, the content of the compound represented by the general formula (I) or the salt thereof may be the same as that described above. When the ink in accordance with the present invention is used as light-color ink having a low coloring material concentration, the content of the compound represented by the general formula (I) or the salt thereof is preferably 0.1 mass % or more and 3.0 mass % or less with respect to the total mass of the ink. Furthermore, the content is more preferably 0.1 mass % or more and 2.5 mass % or less in order to prepare ink excellent in graininess of a recorded article.

The compound represented by the general formula (I) or salt thereof may be used singly or in combination. In the present invention, the compound represented by the general formula (I) or the salt thereof may be used singly as a single coloring material, or may be used in combination with any other coloring material to adjust a color tone or the like. When the compound represented by the general formula (I) or the salt thereof is used in combination with any other coloring material, the ratio between the content of the compound represented by the general formula (I) or the salt thereof and the content of the other coloring material is preferably within the range of 1.0:10.0 to 10.0:1.0.

[Other Colorants]

In the present invention, in addition to the above compound, any coloring material except those described above may be used as a coloring material for toning.

Ink having a color tone different from that of the ink of the present invention such as black ink, cyan ink, magenta ink, or yellow ink may be used in combination for forming a full-color image or the like. So-called light-color ink having the same color tone as that of the ink as described above and having a low coloring material concentration may be used in combination. A coloring material for the ink having a different color tone or for the light-color ink may be a conventionally known coloring material or a coloring material newly synthesized.

When a coloring material for toning is incorporated into ink together with the compound represented by the general formula (I) or the salt thereof, the total content (mass %) of the compound represented by the general formula (I) or the salt thereof and the coloring material for toning is preferably 0.1 mass % or more and 10.0 mass % or less with respect to the total mass of the ink. The reason why such range is preferable is as follows. This is because, as in the case where the compound represented by the general formula (I) or the salt thereof is used singly, a total content of less than 0.1 mass % may not provide a sufficient image density, while a total content in excess of 10.0 mass % may not provide good ink jet property (for example, sticking recovery property of a nozzle portion of a recording head for ejecting ink may not be obtained). The total content of coloring materials in concentrated ink and light-color ink each containing a coloring material for toning is the same as that in the case where no toning is performed.

Hereinafter, specific examples of a coloring material for toning and a coloring material to be used for any other ink to be used in combination with the ink of the present invention will be shown. Of course, the present invention is not limited to the examples.

[Yellow Coloring Material]

C.I. Direct Yellow: 8, 11, 12, 27, 28, 33, 39, 44, 50, 58, 85, 86, 87, 88, 89, 98, 100, 110, 132, 173, and the like C.I. Acid Yellow: 1, 3, 7, 11, 17, 23, 25, 29, 36, 38, 40, 42, 44, 76, 98, 99, and the like C.I. Pigment Yellow: 1, 2, 3, 12, 13, 14, 15, 16, 17, 73, 74, 75, 83, 93, 95, 97, 98, 114, 128, 138, 180, and the like

[Magenta Coloring Material]

C.I. Direct Red: 2, 4, 9, 11, 20, 23, 24, 31, 39, 46, 62, 75, 79, 80, 83, 89, 95, 197, 201, 218, 220, 224, 225, 226, 227, 228, 229, 230, and the like C.I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265, 289, and the like C.I. Food Red: 87, 92, 94, and the like C.I. Direct Violet: 107 and the like C.I. Pigment Red: 2, 5, 7, 12, 48:2, 48:4, 57:1, 112, 122, 123, 168, 184, 202, and the like

[Cyan Coloring Material]

C.I. Direct Blue: 1, 15, 22, 25, 41, 76, 77, 80, 86, 90, 98, 106, 108, 120, 158, 163, 168, 199, 226, 307, and the like C.I. Acid Blue: 1, 7, 9, 15, 22, 23, 25, 29, 40, 43, 59, 62, 74, 78, 80, 90, 100, 102, 104, 112, 117, 127, 138, 158, 161, 203, 204, 221, 244, and the like C.I. Pigment Blue: 1, 2, 3, 15, 15:2, 15:3, 15:4, 16, 22, 60, and the like

[Orange Coloring Material]

C.I. Acid Orange: 7, 8, 10, 12, 24, 33, 56, 67, 74, 88, 94, 116, 142, and the like C.I. Acid Red: 111, 114, 266, 374, and the like C.I. Direct Orange: 26, 29, 34, 39, 57, 102, 118, and the like C.I. Food Orange: 3 and the like C.I. Reactive Orange: 1, 4, 5, 7, 12, 13, 14, 15, 16, 20, 29, 30, 84, 107, and the like C.I. Disperse Orange: 1, 3, 11, 13, 20, 25, 29, 30, 31, 32, 47, 55, 56, and the like C.I. Pigment Orange: 43 and the like C.I. Pigment Red: 122, 170, 177, 194, 209, 224, and the like

[Green Coloring Material]

C.I. Acid Green: 1, 3, 5, 6, 9, 12, 15, 16, 19, 21, 25, 28, 81, 84, and the like C.I. Direct Green: 26, 59, 67, and the like C.I. Food Green: 3 and the like C.I. Reactive Green: 5, 6, 12, 19, 21, and the like C.I. Disperse Green: 6, 9, and the like C.I. Pigment Green: 7, 36, and the like

[Blue Coloring Material]

C.I. Acid Blue: 62, 80, 83, 90, 104, 112, 113, 142, 203, 204, 221, 244, and the like C.I. Reactive Blue: 49 and the like C.I. Acid Violet: 17, 19, 48, 49, 54, 129, and the like C.I. Direct Violet: 9, 35, 47, 51, 66, 93, 95, 99, and the like C.I. Reactive Violet: 1, 2, 4, 5, 6, 8, 9, 22, 34, 36, and the like C.I. Disperse Violet: 1, 4, 8, 23, 26, 28, 31, 33, 35, 38, 48, 56, and the like C.I. Pigment Blue: 5:6 and the like C.I. Pigment Violet: 19, 23, 37, and the like

[Black Coloring Material]

C.I. Direct Black: 17, 19, 22, 31, 32, 51, 62, 71, 74, 112, 113, 154, 16,8, 195, and the like C.I. Acid Black: 2, 48, 51, 52, 110, 115, 156, and the like C.I. Food Black: 1, 2, and the like Carbon black and the like (Compound Represented by General Formula (II))

The ink jet ink in accordance with the present invention contains a compound represented by the following general formula (II) as an essential component.

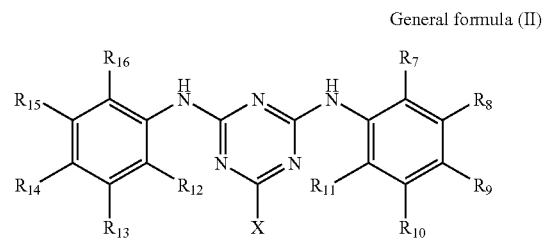

General formula (II)

(In the general formula (II): $R_7$, $R_8$, $R_9$, $R_{10}$, $R_{11}$, $R_{12}$, $R_{13}$, $R_{14}$, $R_{15}$, and $R_{16}$ each independently represent a hydrogen atom, an alkyl group having 1 to 8 carbon atoms, or a carboxyl group or a salt thereof provided that $R_7$, $R_8$, $R_9$, $R_{10}$, $R_{11}$, $R_{12}$, $R_{13}$, $R_{14}$, $R_{15}$, and $R_{16}$ cannot simultaneously represent hydrogen atoms, and at least one of $R_7$, $R_8$, $R_9$, $R_{10}$, $R_{11}$, $R_{12}$, $R_{13}$, $R_{14}$, $R_{15}$, and $R_{16}$ represents a carboxyl group or a salt thereof; and X represents a chlorine atom, a hydroxyl group, an amino group, or a monoalkylamino or dialkylamino group which may have a substituent selected from the group consisting of a sulfonic group, a carboxyl group, and a hydroxyl group on an alkyl group.)

In the present invention, the compound represented by the general formula (II) is preferably present in the vicinity of the surface of a recording medium because excellent light fastness or the like can be obtained with the mechanism described above. Therefore, the compound represented by the general formula (II) is particularly preferably structured in such a manner that the phenyl groups at the both ends of the molecular structure are each substituted by one carboxyl group, i.e., a total of two carboxyl groups.

Furthermore, the compound represented by the general formula (II) is preferably used in the form of a salt of an alkali metal. The alkali metal is preferably sodium in terms of striking a balance between the ejection stability of ink and the solubility of the compound in the ink. A preferable specific example of the compound represented by the general formula (II) includes Exemplified Compound B below.

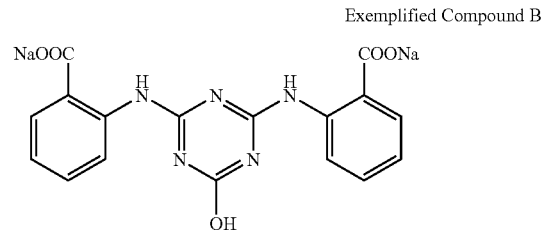

Exemplified Compound B

The content (mass %) of the compound represented by the general formula (II) is preferably 0.02 mass % or more with respect to the total mass of ink. This is because a content of less than 0.02 mass % may have an insufficient improving effect on light fastness.

Further, in order to more improve the effects of the present invention on light fastness and the like, it is preferable that the content (mass %) of the compound represented by the general formula (I) or the salt thereof and the content (mass %) of the compound represented by the general formula (II) in the ink of the present invention satisfy the following relational equation (2):

0.5≦((Content (mass %) of compound represented by general formula (I) or salt thereof)/(Content (mass %) of compound represented by general formula (II)))≦1,000

(Method of Testing Compound Represented by General Formula (I) or a Salt Thereof and Compound Represented by General Formula (II))

The compound represented by the general formula (I) or the salt thereof and the compound represented by the general formula (II) to be used in the present invention can be tested by following methods (1) to (3) each of which involves the use of high performance liquid chromatography (HPLC).

(1) Retention time of a peak
(2) Maximum absorption wavelength in the peak of (1)
(3) M/Z (posi, nega) of mass spectrum in the peak of (1)

Analysis conditions for high performance liquid chromatography are as shown below.

An ink solution diluted about 1,000 times with pure water is analyzed by means of high performance liquid chromatography under the following conditions to measure the retention time of a peak and the maximum absorption wavelength of a peak.

Column: Symmetry C18 2.1 mm×150 mm
Column temperature: 40° C.
Flow rate: 0.2 ml/min
PDA: 210 nm to 700 nm
Mobile phase and gradient condition: Table 1

TABLE 1

| | 0-5 min | 5-40 min | 40-45 min |
|---|---|---|---|
| A Water | 85% | 85%→0% | 0% |
| B Methanol | 10% | 10%→95% | 95% |
| C 0.2 mol/L aqueous solution of ammonium acetate | 5% | 5% | 5% |

In addition, analysis conditions for mass spectrum are as shown below.

The mass spectrum of the resultant peak is measured under the following conditions, and the most strongly detected M/Z is measured for each of posi and nega.

Ionization Method

| ESI | Capillary voltage | 3.5 kV |
|---|---|---|
| | Desolvating gas | 300° C. |
| | Ion source temperature | 120° C. |
| Detector | posi | 40 V 200-1,500 amu/0.9 sec |
| | nega | 40 V 200-1,500 amu/0.9 sec |

Table 2 shows the values of the retention time, maximum absorption wavelength, M/Z(posi), and M/Z(nega) of, for example, each of Exemplified Compound A and Exemplified Compound B described above. When a compound has the values shown in Table 2, the compound can be determined to be the compound to be used in the present invention.

TABLE 2

| | Retention time [min] | Maximum absorption wavelength [nm] | M/Z Posi | M/Z Nega |
|---|---|---|---|---|
| Exemplified Compound A | 21-23 | 530-550 | 941-944 | 469-471 |
| Exemplified Compound B | 22.5-24.5 | 270-290 | 367-369 | 365-367 |

(PH of Ink)

Preferable conditions under which the ink of the present invention exerts particularly excellent ink performance as well as excellent light fastness will be described below.

Since the compound represented by the general formula (II) has a carboxyl group, the solubility of the compound represented by the general formula (II) lowers when the pH of ink is a strong acidic one. Therefore, the compound represented by the general formula (II) needs to be stably dissolved by adjusting the pH of the ink. Further, when considering ink resistance of a respective member constituting an ink jet recording apparatus, disadvantages may occur when the pH of ink is a strong basic one.

The inventors have made studies in view of the above two points. As a result, they have found that in the case where the pH of ink at 25° C. and the content (mass %) of the compound represented by the general formula (II) with respect to the total mass of the ink satisfy the following relational equation (1):

(Content (mass %) of compound represented by general formula (II))≦0.00015×(pH of ink)$^{4.05}$, even when the ink is stored for a long time period, the compound represented by the general formula (II) does not precipitate, no disadvantages occur in an ink jet recording apparatus, and performance suitable for ink jet ink can be obtained.

In the relational equation (1), the pH is 4.0 or more and 11.0 or less.

FIG. 1 is a graphical representation showing a relationship between the content (mass %) of Exemplified Compound B above as a specific example of the compound represented by the general formula (II) with respect to the total mass of ink and the pH of the ink at 25° C. The axis of ordinate indicates the content (mass %) of Exemplified Compound B above with respect to the total mass of the ink and the axis of abscissa indicates the pH of the ink at 25° C. The relationship represented by the expression (1) corresponds to the shaded portion in FIG. 1.

Figure 2:
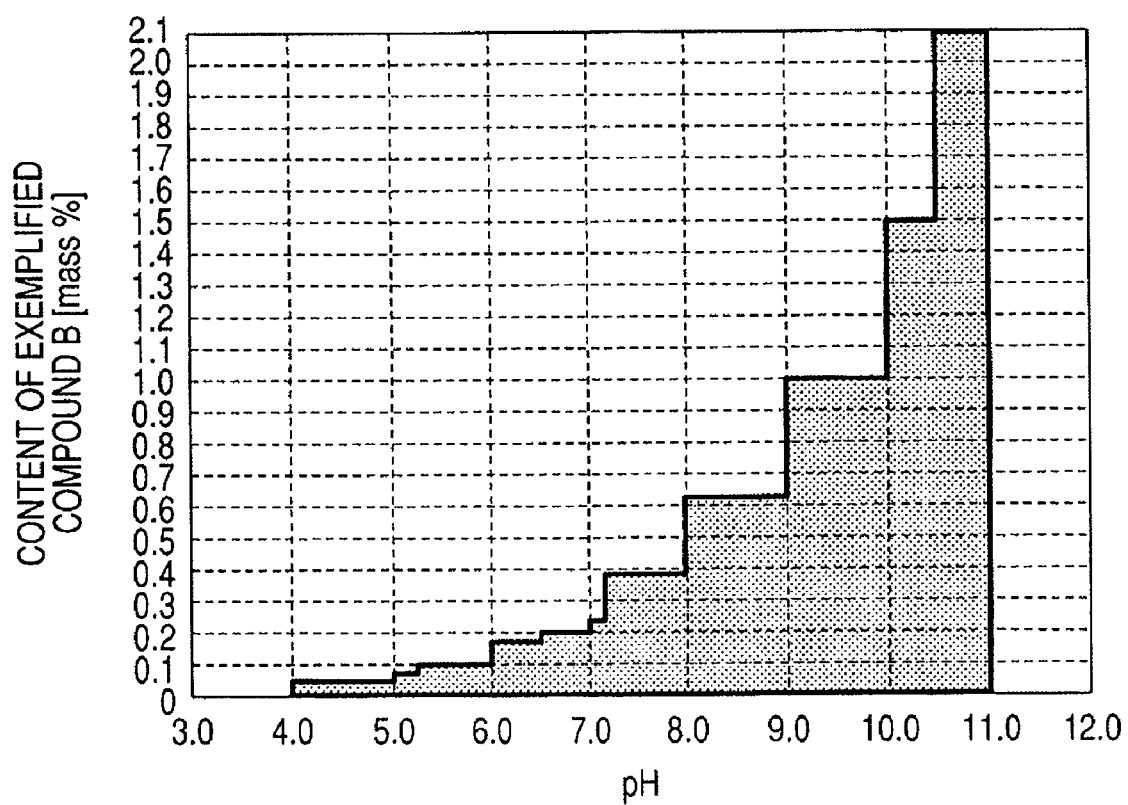
FIG. 2 is a graphical representation showing a preferable range for obtaining excellent ink stability at the time of storage at a low temperature.

In consideration of storage of the ink of the present invention in an environment having a low temperature (for example, 5° C.), it is preferable that the conditions shown by the shaded portion in FIG. 2 are satisfied. That is, it is preferable that: the ink have a pH of 4.0 or more and 11.0 or less at 25° C.; and the pH and the content (mass %) of the compound represented by the general formula (II) with respect to the total mass of the ink satisfy any one of the following relationships (a) to (k) in order to obtain excellent ink stability at the time of storage at a low temperature:

(a) When the pH is 10.5 or more and 11.0 or less, the content is 2.10 mass % or less;
(b) When the pH is 10.0 or more and less than 10.5, the content is 1.50 mass % or less;
(c) When the pH is 9.0 or more and less than 10.0, the content is 1.00 mass % or less;
(d) When the pH is 8.0 or more and less than 9.0, the content is 0.62 mass % or less;
(e) When the pH is 7.2 or more and less than 8.0, the content is 0.38 mass % or less;
(f) When the pH is 7.0 or more and less than 7.2, the content is 0.23 mass % or less;
(g) When the pH is 6.5 or more and less than 7.0, the content is 0.18 mass % or less.
(h) When the pH is 6.0 or more and less than 6.5, the content is 0.14 mass % or less;

(i) When the pH is 5.2 or more and less than 6.0, the content is 0.09 mass % or less;
(j) When the pH is 5.0 or more and less than 5.2, the content is 0.06 mass % or less; and
(k) When the pH is 4.0 or more and less than 5.0, the content is 0.04 mass % or less.

Further, in consideration of ink resistance of respective members constituting an ink jet recording apparatus and storage of the ink in an environment having a low temperature (for example, 5° C.), it is more preferable that: the ink have a pH of 5.0 or more and 10.0 or less at 25° C.; and the pH and the content (mass %) of the compound represented by the general formula (II) with respect to the total mass of the ink satisfy any one of the following relationships (q) to (x):
(q) When the pH is 8.6 or more and 10.0 or less, the content is 0.42 mass % or less;
(r) When the pH is 8.3 or more and less than 8.6, the content is 0.29 mass % or less;
(s) When the pH is 7.7 or more and less than 8.3, the content is 0.24 mass % or less;
(t) When the pH is 7.5 or more and less than 7.7, the content is 0.17 mass % or less;
(u) When the pH is 6.5 or more and less than 7.5, the content is 0.14 mass % or less;
(v) When the pH is 6.1 or more and less than 6.5, the content is 0.11 mass % or less;
(w) When the pH is 5.5 or more and less than 6.1, the content is 0.06 mass % or less; and
(x) When the pH is 5.0 or more and less than 5.5, the content is 0.04 mass % or less.

Figure 3:
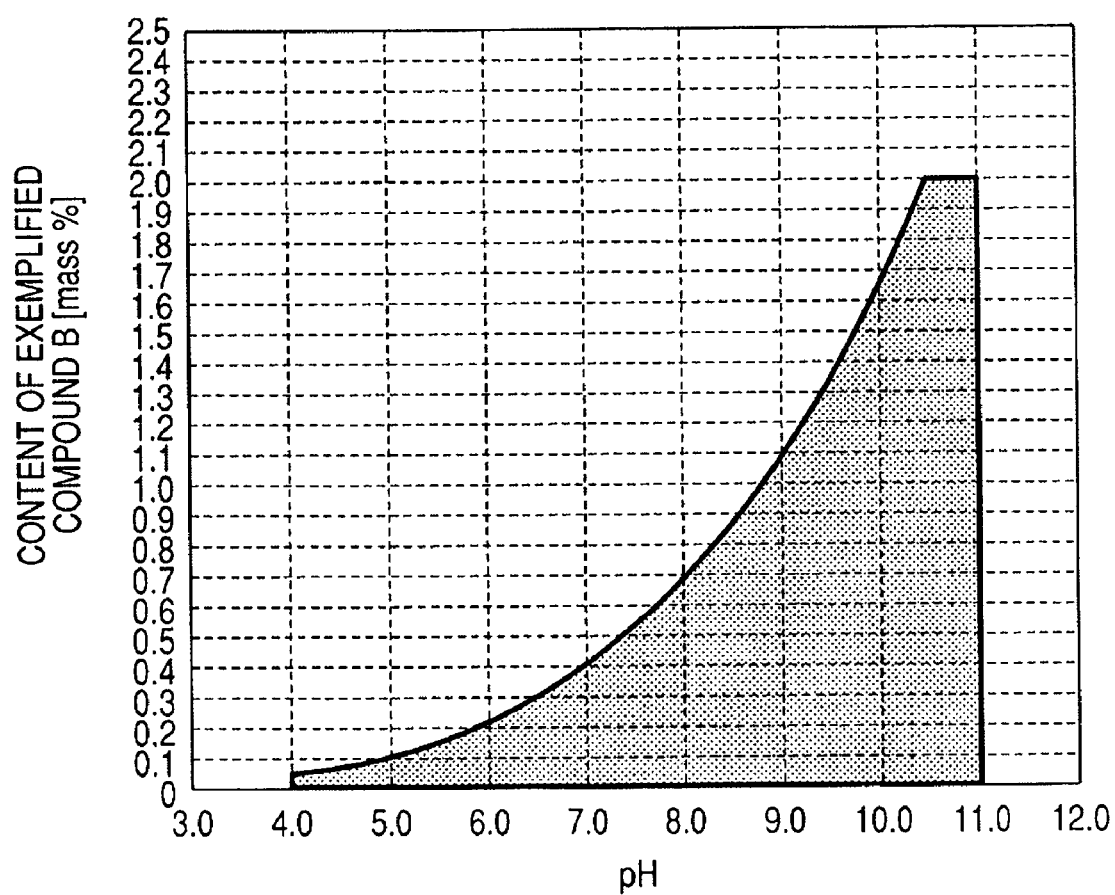
FIG. 3 is a graphical representation showing a preferable range for obtaining excellent initial ejection property immediately after printing.

When ejecting the ink of the present invention from a predetermined nozzle and then leaving the predetermined nozzle for a certain time period without any ejection of the ink and thereafter ejecting the ink again from the predetermined nozzle, in order to allow the ink to be stably ejected and to provide a good printed image, it is preferable that the conditions shown by the shaded portion in FIG. 3 are satisfied. That is, the content (mass %) of the compound represented by the general formula (II) with respect to the total mass of the ink is preferably 2.00 mass % or less, or more preferably 1.00 mass % or less in order to obtain excellent initial ejection property immediately after printing. In this case as well, the relationship represented by the expression (1) is preferably satisfied in consideration of the storage stability of the ink.

Figure 4:
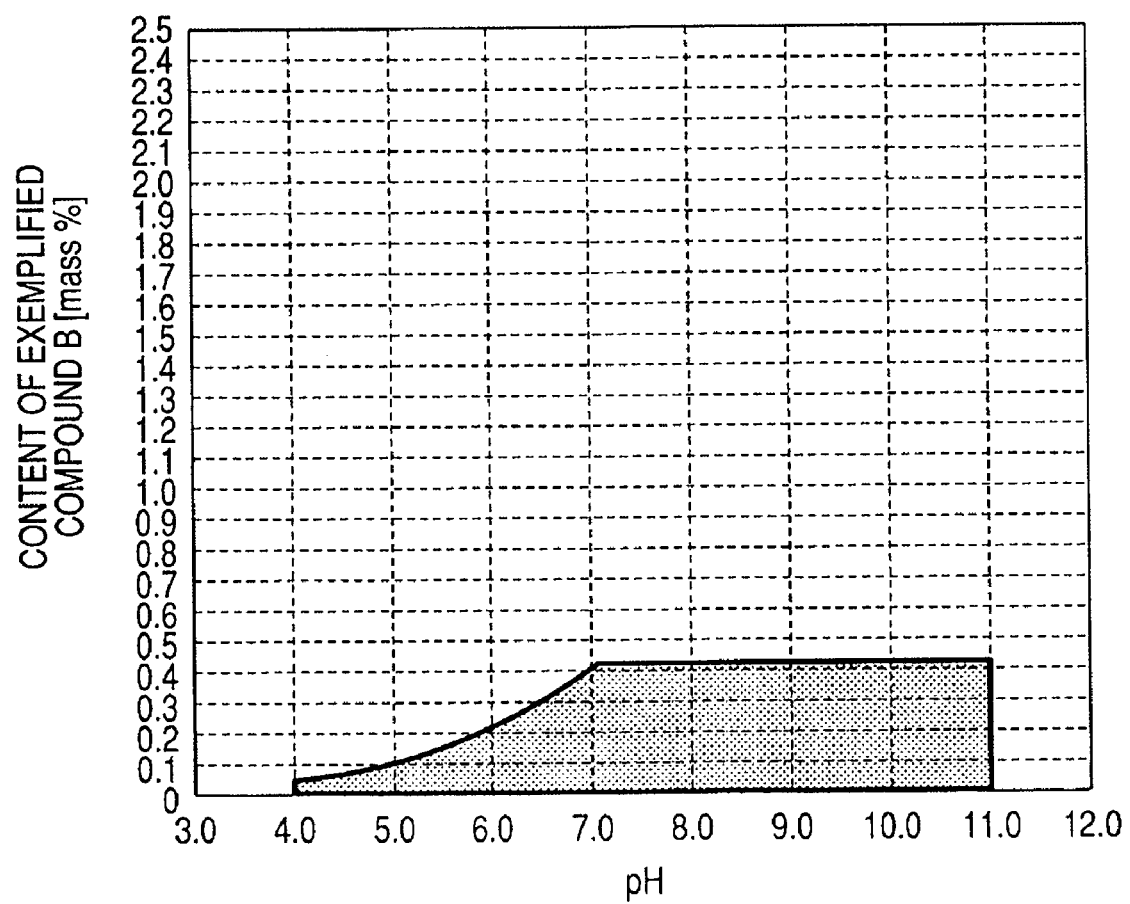
FIG. 4 is a graphical representation showing a preferable range for obtaining excellent image quality.

In order to make a recorded article obtained by means of the ink of the present invention have substantially no change in image density or in tint as compared to a recorded article obtained by means of ink that does not contain any compound represented by the general formula (II), in other words, in order to make the recorded article obtained by means of the ink of the present invention have good image quality, it is preferred that the conditions shown by the shaded portion in FIG. 4 are satisfied. That is, in order to obtain excellent image quality, it is preferable that the content (mass %) of the compound represented by the general formula (II) with respect to the total mass of the ink is preferably 0.42 mass % or less. In this case as well, in consideration of the storage stability of the ink, it is preferable that the relationship represented by the expression (1) is satisfied.

Figure 5:
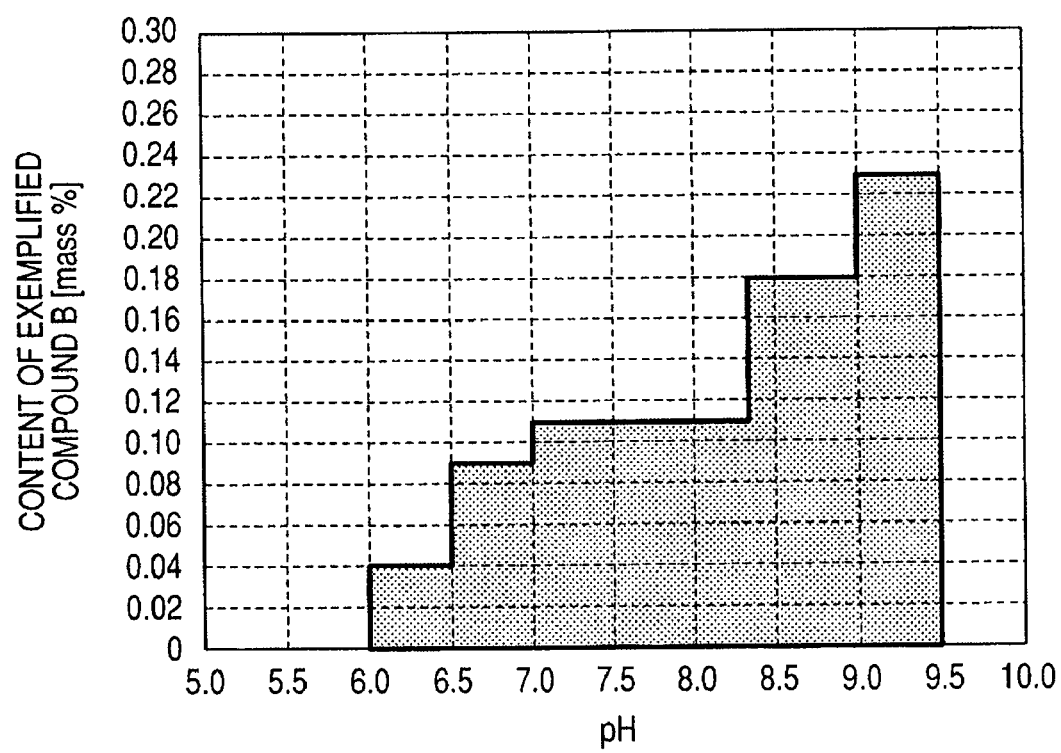
FIG. 5 is a graphical representation showing a preferable range for obtaining excellent printing continuability.

In consideration of the use of the ink of the present invention for an ink jet recording apparatus having a large number of pulses applied per nozzle of a recording head during the use of the ink jet recording apparatus, it is preferable that the conditions shown by the shaded portion in FIG. 5 are satisfied. That is, it is preferable that: the ink have a pH of 6.0 or more and 9.5 or less at 25° C.; and the pH and the content (mass %) of the compound represented by the general formula (II) with respect to the total mass of the ink satisfy any one of the following relationships (l) to (p) in order to obtain excellent printing continuability:
(l) When the pH is 9.0 or more and 9.5 or less, the content is 0.23 mass % or less;
(m) When the pH is 8.3 or more and less than 9.0, the content is 0.18 mass % or less;
(n) When the pH is 7.0 or more and less than 8.3, the content is 0.11 mass % or less;
(o) When the pH is 6.5 or more and less than 7.0, the content is 0.09 mass % or less; and
(p) When the pH is 6.0 or more and less than 6.5, the content is 0.04 mass % or less.

Incidentally, in the present invention, the pH of the ink was measured by means of a pH METER F-21 (trade name; manufactured by HORIBA).

(Aqueous Medium)

An ink composition of the present invention can use water or an aqueous medium which is a mixed solvent of water and any one of various water-soluble organic solvents.

The water-soluble organic solvents are not particularly limited as long as they are water-soluble, and examples of an available water-soluble organic solvent include: an alkyl alcohol having 1 to 4 carbon atoms such as ethanol, isopropanol, n-butanol, isobutanol, sec-butanol, or tert-butanol; a carboxylic acid amide such as N,N-dimethylformamide or N,N-dimethylacetamide; a ketone such as acetone, methyl ethyl ketone, or 2-methyl-2-hydroxypentan-4-one; a cyclic ether such as a keto alcohol, tetrahydrofuran, or dioxane; a polyhydric alcohol such as glycerin, ethylene glycol, diethylene glycol, triethylene glycol, tetraethylene glycol, 1,2- or 1,3-propylene glycol, 1,2- or 1,4-butylene glycol, polyethylene glycol, 1,3-butanediol, 1,5-pentanediol, 1,2-hexanediol, 1,6-hexanediol, dithioglycol, 2-methyl-1,3-propanediol, 1,2,6-hexanetriol, an acetylene glycol derivative, or trimethylolpropane; an alkyl ether of a polyhydric alcohol such as ethylene glycol monomethyl (or ethyl) ether, diethylene glycol monomethyl (or ethyl) ether, or triethylene glycol monoethyl (or butyl) ether; a heterocyclic compound such as 2-pyrrolidone, N-methyl-2-pyrrolidone, 1,3-dimethyl-2-imidazolidinone, or N-methylmorpholine; a sulfur-containing compound such as dimethyl sulfoxide; and urea and a urea derivative. Each of those water-soluble organic solvents may be used singly or in combination.

The content of such water-soluble organic solvent is preferably 5 mass % to 90 mass %, or more preferably 10 mass % to 50 mass % with respect to the total mass of ink. The reason for the above is as follows. When the content is lower than 5 mass %, reliability such as ejection property may deteriorate when used for ink jet ink, while when the content is larger than 90 mass %, insufficient ink supply due to an increase in viscosity of ink may occur.

Deionized water (ion-exchanged water) is preferably used as water. The water content is preferably 10 mass % to 90 mass % with respect to the total mass of ink.

(Other Additive)

In addition, in the present invention, various additives such as a surfactant, a pH adjustor, a rust inhibitor, an antiseptic, an antifungal agent, a chelating agent, a UV absorber, a viscosity regulator, an anti-foaming agent, and a water-soluble polymer may be incorporated as required.

Specific examples of the surfactant include an anionic surfactant, an amphoteric surfactant, a cationic surfactant, and a nonionic surfactant.

Specific examples of the anionic surfactant include: an alkylsulfocarboxylate; an α-olefinsulfonate; a polyoxyethylene alkyl ether acetate; N-acylamino acid and a salt thereof; an N-acylmethyltaurine salt; an alkylsulfate polyoxyalkyl ether sulfate; an alkylsulfate polyoxyethylene ether phosphate; rosin soap; a castor oil sulfate; lauryl alcohol sulfate; an alkylphenol phosphate; an alkyl phosphate; an alkylallylsulfonate; a diethylsulfosuccinate; a diethylhexylsulfosuccinate and dioctylsulfosuccinate.

Specific examples of the cationic surfactant include a 2-vinylpyridine derivative and a poly(4-vinylpyridine) derivative. Examples of the amphoteric surfactant include lauryldimethylaminoacetic acid betaine, 2-alkyl-N-carboxymethyl-N-hydroxyethylimidazolinium betaine, coconut oil fatty amide propyldimethylaminoacetic acid betaine, polyoctylpolyaminoethylglycine, and other imidazoline derivatives.

Specific examples of the nonionic surfactant include: ethers such as polyoxyethylene nonylphenyl ether, polyoxyethylene octylphenyl ether, polyoxyethylene dodecylphenyl ether, polyoxyethylene lauryl ether, polyoxyethylene oleyl ether, polyoxyethylene alkyl ether, and polyoxyaralkyl alkyl ether; esters such as polyoxyethyleneoleic acid, polyoxyethylene oleate, polyoxyethylene distearate, sorbitan laurate, sorbitan monostearate, sorbitan monooleate, sorbitan sesquioleate, polyoxyethylene monooleate, and polyoxyethylene stearate; and acetylene glycol nonionic surfactants such as 2,4,7,9-tetramethyl-5-decyn-4,7-diol, 3,6-dimethyl-4-octyn-3,6-diol, and 3,5-dimethyl-1-hexyn-3-ol (for example, Acetylenol EH (trade name) manufactured by Kawaken Fine Chemicals Co., Ltd. and Surfynol 104, 82, and 465, and Olfin STG (trade names) all manufactured by Nissin Chemical Industry Co., Ltd.).

Any substance can be used as a pH adjustor as long as the substance is capable of adjusting the pH of ink to fall within a predetermined range. Examples of such substance include: alcoholamine compounds such as diethanolamine, triethanolamine, isopropanolamine, and trishydroxymethylaminomethane; hydroxides of alkali metals such as lithium hydroxide and potassium hydroxide; ammonium hydroxide; and carbonates of alkali metals such as lithium carbonate, sodium carbonate, and potassium carbonate.

Specific examples of the antiseptic and antifungal agent include organic sulfur type, organic nitrogen/sulfur type, organic halogen type, haloarylsulfone type, iodopropargyl type, N-haloalkylthio type, benzthiazole type, nitrile type, pyridine type, 8-oxyquinoline type, benzothiazole type, isothiazoline type, dithiol type, pyridine oxide type, nitropropane type, organotin type, phenol type, quaternary ammonium salt type, triazine type, thiadiazine type, anilide type, adamantine type, dithiocarbamate type, bromoindanone type, benzyl bromoacetate type, and inorganic salt type compounds.

Examples of the organic halogen type compound include sodium pentachlorophenol. Examples of the pyridine oxide type compound include 2-pyridinethiol-1oxide sodium. Examples of the inorganic salt type compound include anhydrous sodium acetate. Examples of the isothiazoline type compound include 1,2-benzoisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, and 5-chloro-2-methyl-4-isothiazolin-3-one calcium chloride. Other specific examples of the antiseptic and antifungal agent include sodium sorbate and sodium benzoate, and specifically include Proxel GXL(S) and Proxel XL-2(S) (trade names) manufactured by Avecia Inc.

Examples of the chelating agent include sodium citrate, sodium ethylenediamine tetraacetate, dinitrotriacetate, sodium hydroxyethylethylenediamine tetraacetate, sodium diethylenetriamine pentaacetate, and sodium uramildiacetate.

Examples of the rust inhibitor include an acidic sulfite, sodium thiosulfate, thiodiglycolic acid ammonium, diisopropylammonium nitrite, pentaerythritol tetranitrate, and dicyclohexylammonium nitrite.

Examples of the available UV absorber include compounds that absorb ultraviolet light to effect fluorescence typified by a benzophenone type compound, a benzotriazole type compound, a cinnamic acid type compound, a triazine type compound, a stilbene type compound, and a benzoxazole type compound, that are so-called fluorescent brighteners.

Examples of the viscosity modifier include water-soluble polymer compounds in addition to water-soluble organic solvents, and specifically include polyvinyl alcohol, a cellulose derivative, polyamine, and polyimine.

As the anti-foaming agent, a fluorine type or silicone type compound is used as needed.

<Recording Medium>

Any recording medium can be used for forming images by means of the ink of the present invention as long as recording is performed by applying the ink to the recording medium.

The present invention is applicable to a recording medium in which a coloring material such as a dye or pigment is absorbed to a fine particle forming a porous structure of an ink-receiving layer and an image is formed of at least the fine particles with the coloring material absorbed thereto, and is particularly suitable for the case where an ink jet method is used. Such an ink jet recording medium is preferably of a so-called absorption type in which ink is absorbed by a gap formed in an ink-receiving layer on a support.

An absorption type ink-receiving layer is constituted as a porous layer mainly composed of fine particles and containing a binder and any other additive as required. Specific examples of the fine particles include: inorganic pigments such as silica, clay, talc, calcium carbonate, kaolin, aluminium oxide (for example, alumina or alumina hydrate), diatomaceous earth, titanium oxide, hydrotalcite, and zinc oxide; and organic pigments such as a urea formalin resin, an ethylene resin, and a styrene resin. One or more kinds of them may be used. Examples of a binder that is suitably used include a water-soluble polymer and latex. Examples of an available binder include: polyvinyl alcohol or a denatured product thereof; starch or a modified product thereof; gelatin or a modified product thereof; gum arabic; cellulose derivatives such as carboxymethylcellulose, hydroxyethylcellulose, and hydroxyproylmethylcellulose; vinyl type copolymer latexes such as an SBR latex, an NBR latex, a methyl methacrylate-butadiene copolymer latex, a functional group-modified polymer latex, and an ethylene-vinyl acetate copolymer; polyvinyl pyrrolidone; maleic anhydride or a copolymer thereof; and an acrylate copolymer. Two or more kinds of them can be used in combination as required. In addition, an additive may be used, and examples of such additive to be used as needed include a dispersant, a thickener, a pH adjustor, a lubricant, a fluidity denaturing agent, a surfactant, a defoaming agent, a releasing agent, a fluorescent dye, a UV absorber, and an antioxidant.

In particular, a recording medium having formed thereon an ink-receiving layer mainly composed of fine particles having an average particle size of 1 μm or less is preferably used in the present invention. Particularly preferable examples of the fine particles include silica fine particles and aluminum oxide fine particles. Preferable silica fine particles are silica fine particles typified by colloidal silica. Colloidal silica, which itself is available from the market, is particularly preferably that described in Japanese Patent No. 2803134 or Japanese Patent No. 2881847. Preferable aluminum oxide fine particles are alumina hydrate fine particles and the like. An alumina hydrate represented by the following general formula can be exemplified as one example of such alumina hydrate fine particles.

$AlO_{3-n}(OH)_{2n} \cdot mH_2O$ (In the formula, n represents an integer of 1, 2, or 3, and m represents a value of 0 to 10, or preferably 0 to 5; provided, however, that m and n cannot be simultaneously 0. m may be or may not be an integer because $mH_2O$ also represents an aqueous phase that can desorb and is not involved in the formation of an $mH_2O$ crystal lattice in many cases. In addition, heating such kind of material may cause m to reach 0.)

An alumina hydrate can be produced by means of a conventionally known method such as the hydrolysis of aluminum alkoxide or sodium aluminate described in U.S. Pat. No. 4,242,271 or U.S. Pat. No. 4,202,870; or a method involving adding an aqueous solution of sodium sulfate, aluminum chloride, or the like to an aqueous solution of sodium aluminate or the like to perform neutralization described in Japanese Patent Publication No. S57-44605.

The recording medium preferably has a support for supporting the above-described ink-receiving layer. Any support can be used without any particular limitation as long as its ink-receiving layer can be formed of the above-described porous fine particles and the support provides rigidity such that the support can be conveyed by a conveying mechanism of an ink jet printer or the like. Specific examples thereof include: a paper support formed of a pulp raw material mainly composed of natural cellulose fibers; a plastic support composed of a material such as polyester (for example, polyethylene terephthalate), cellulose triacetate, polycarbonate, polyvinyl chloride, polypropylene, or polyimide; and resin-coated paper (for example, RC paper) having, on at least one side of a base paper, a polyolefin resin coating layer added with a white pigment or the like.

<Ink Set>

The ink of the present invention can be preferably used in combination with any other ink to provide an ink set. The term "ink set" as used herein refers to a state where the ink of the present invention is used in combination with any other ink such as cyan ink, magenta ink, yellow ink, or black ink. The other ink that can be used in combination with the ink of the present invention to provide an ink set is not particularly limited. In addition, the term "ink set" as used herein includes, of course, an ink tank itself having multiple ink tank portions integrated with each other. Furthermore, the term includes a state where multiple ink tanks different from each other are used together and a state where these ink tanks and a recording head are integrated.

To be specific, a state where light-color ink to serve as the ink according to the present invention and concentrated ink to serve as the ink according to the present invention are charged in respective ink tanks to be used in combination, or a state where an ink cartridge in which light-color ink to serve as the ink according to the present invention and any other ink are integrated and an ink cartridge in which concentrated ink to serve as the ink according to the present invention and any other ink are integrated are used in combination is exemplified.

<Ink Jet Recording Method>

The ink according to the present invention is particularly suitably used for an ink jet recording method including ejecting the ink by means of an ink jet method. Examples of the ink jet recording method include a recording method involving applying mechanical energy to ink to eject the ink and a recording method involving applying thermal energy to ink to eject the ink. An ink jet recording method involving the use of thermal energy is particularly preferably used in the present invention.

<Ink Cartridge>

An example of an ink cartridge suitable for performing recording by means of the ink according to the present invention includes an ink cartridge including an ink storage portion for storing the ink.

<Recording Unit>

An example of a recording unit suitable for performing recording by means of the ink according to the present invention includes a recording unit including an ink storage portion for storing the ink and a recording head. In particular, a recording unit in which the recording head applies thermal energy corresponding to a recording signal to the ink to generate an ink droplet by virtue of the energy can be exemplified.

<Ink Jet Recording Apparatus>

An example of a recording apparatus suitable for performing recording by means of the ink according to the present invention includes a recording apparatus in which a thermal energy corresponding to a recording signal is applied to ink in the chamber of a recording head having an ink storage portion for storing the ink to generate an ink droplet by virtue of the energy.

Hereinafter, the schematic constitution of an example of a mechanism portion of an ink jet recording apparatus will be described. A recording apparatus main body is constituted by a sheet feeding portion, a sheet conveying portion, a carriage portion, a sheet discharge portion, and a cleaning portion, and an external packaging portion having a main body cover M7030 for protecting them and providing them with design to achieve a role of each mechanism. Hereinafter, the outline of each of them will be described.

Figure 10:
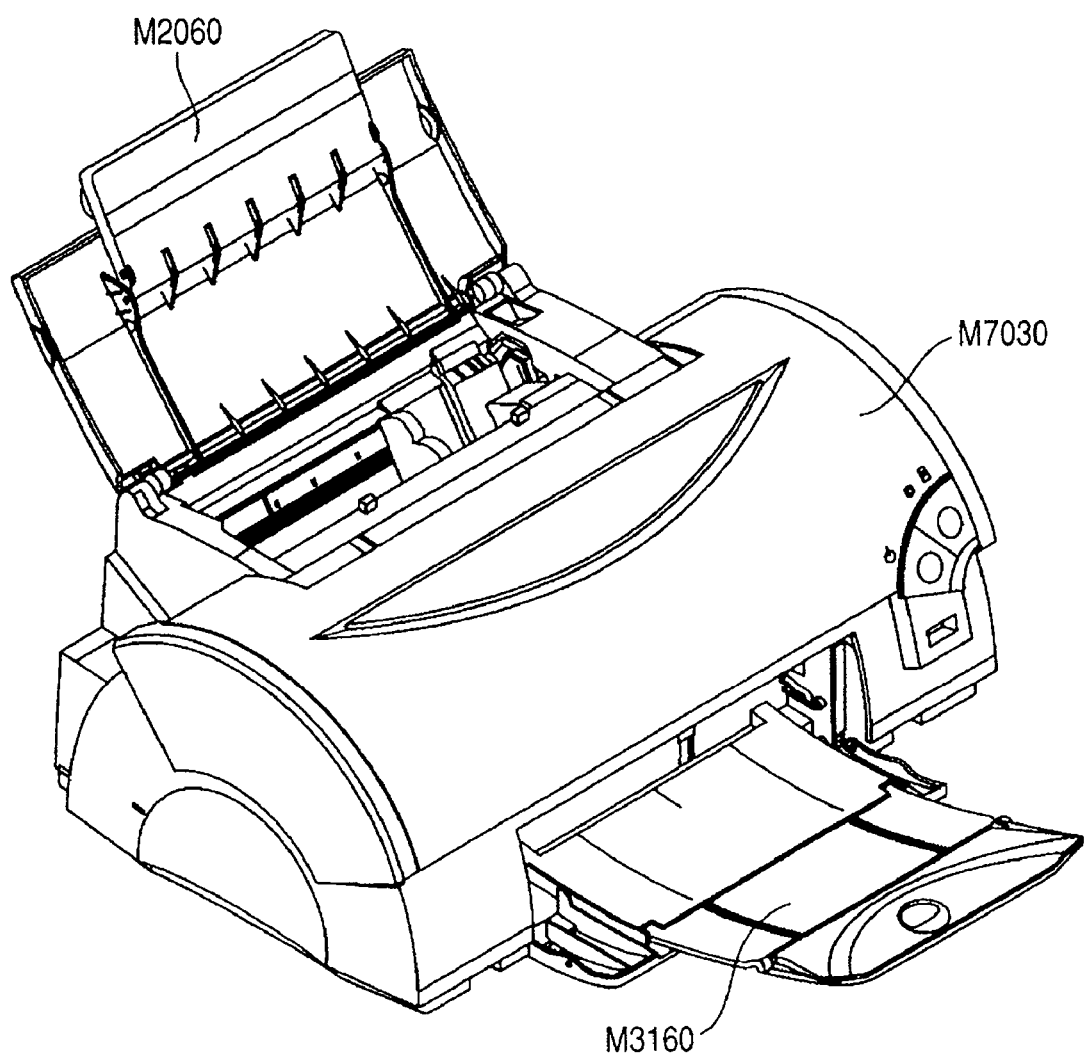
FIG. 10 is a perspective view of a recording apparatus.
Figure 11:
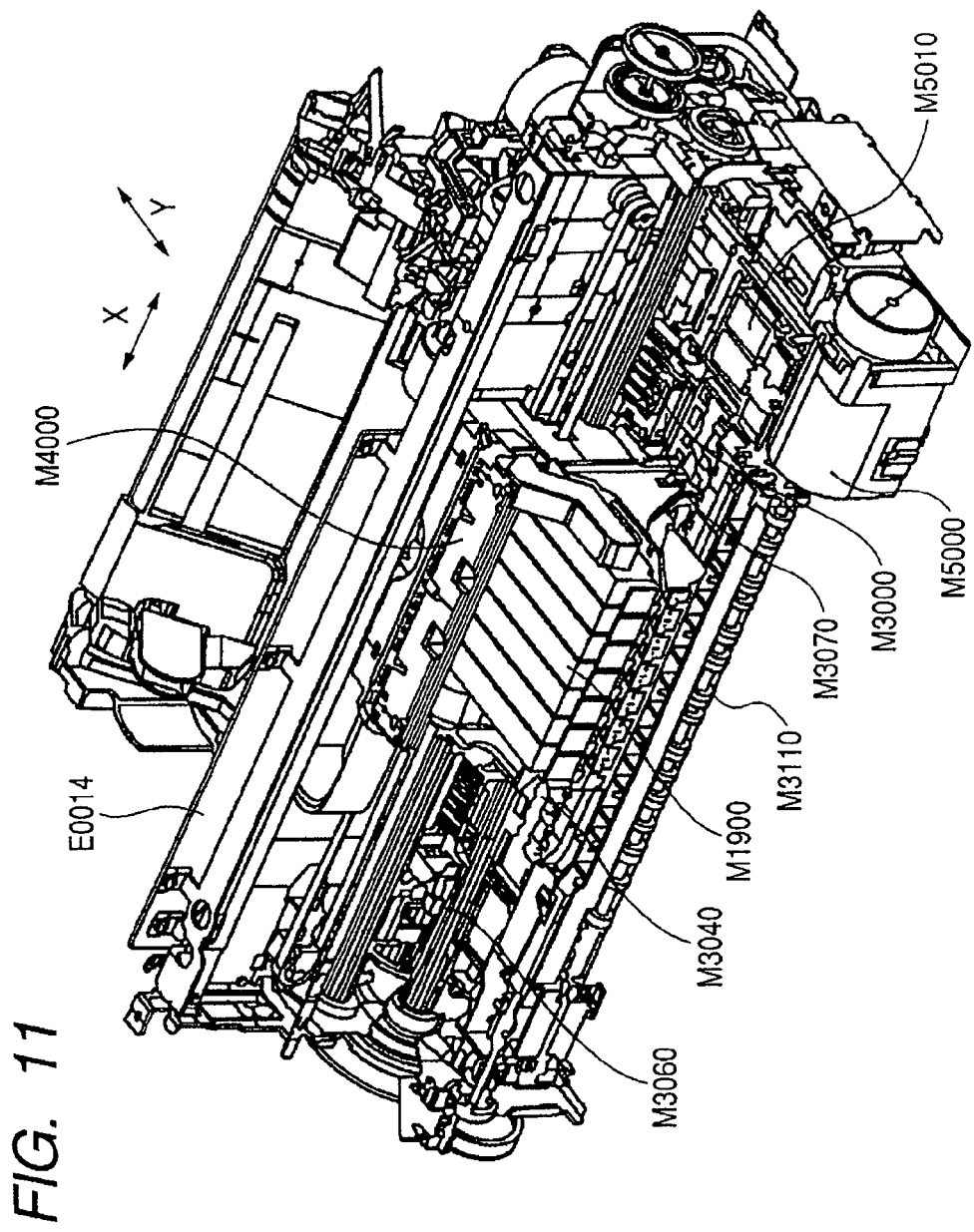
FIG. 11 is a perspective view of a mechanism portion of the recording apparatus.
Figure 12:
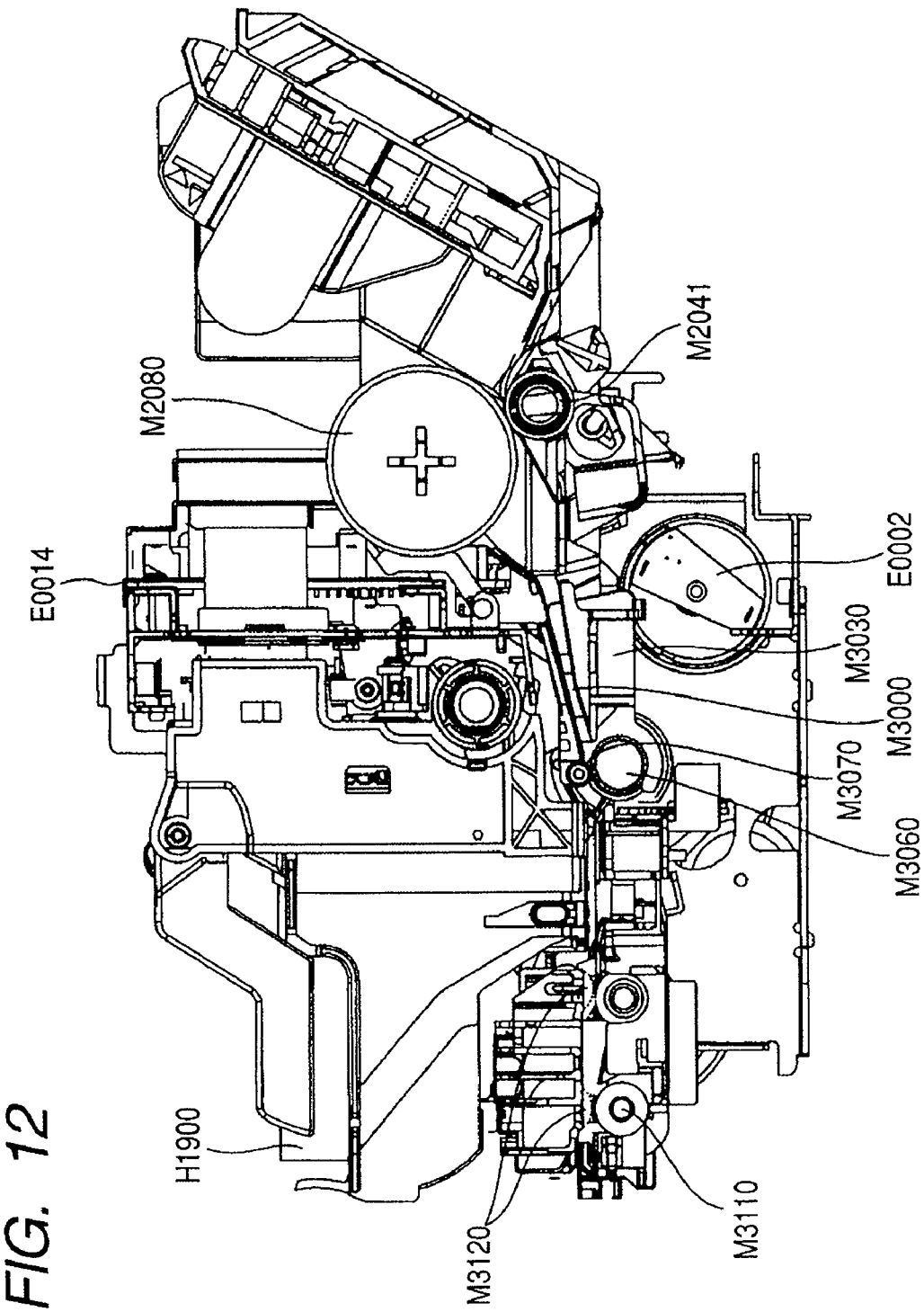
FIG. 12 is a sectional view of the recording apparatus.

FIG. 10 is a perspective view of a recording apparatus. FIGS. 11 and 12 are views for explaining the internal mechanism of a recording apparatus main body, respectively. FIG. 11 is a perspective view seen from an upper right position, and FIG. 12 is a side sectional view of the recording apparatus main body.

When a sheet is to be fed in the recording apparatus, only a predetermined number of recording media sheets are sent to a nip portion consisting of a sheet feeding roller M2080 and a separating roller M2041 in the sheet feeding portion including a sheet feeding tray M2060. The thus sent recording media are separated at the nip portion, and only the uppermost recording medium sheet is conveyed. The recording medium sent to the sheet conveying portion is guided by a pinch roller holder M3000 and a paper guide flapper M3030 to be sent to a roller pair consisting of a conveying roller M3060 and a pinch roller M3070. The roller pair consisting of the conveying roller M3060 and the pinch roller M3070 are rotated by the driving of an LF motor E0002, and the rotation causes the recording medium to be conveyed on a platen M3040.

In the carriage portion, when an image is to be formed on a recording medium, a recording head H1001 (FIG. 13) is arranged at a target image forming position, and ink is ejected to the recording medium in accordance with a signal from an electrical substrate E0014. Details about the constitution of the recording head H1001 will be described later. While recording is performed by the recording head H1001, recording main scanning in which a carriage M4000 scans in a column direction and sub scanning in which a recording medium is conveyed in a row direction by the conveying roller M3060 are alternately repeated, whereby an image is formed on the recording medium.

Finally, the recording medium on which an image has been formed is interposed at a nip between a first sheet discharge roller M3110 and a spur M3120 in the sheet discharge portion, conveyed, and discharged to a sheet discharge tray M3160.

In the cleaning portion, when a pump M5000 is allowed to act in a state where a cap M5010 is brought into close contact with an ink ejection port of the recording head H1001 for the purpose of cleaning the recording head H1001 before and after image recording, unnecessary ink and the like are sucked from the recording head H1001. The ink remaining in the cap M5010 is sucked with the cap M5010 opened, whereby neither adhesion of the remaining ink nor a subsequent harmful effect occurs.

(Constitution of Recording Head)

The constitution of a head cartridge H1000 will be described. The head cartridge H1000 includes the recording head H1001, means for mounting ink tanks H1900, and means for supplying ink from the ink tanks H1900 to the recording head, and is mounted on the carriage M4000 so as to be attachable thereto and detachable therefrom.

Figure 13:
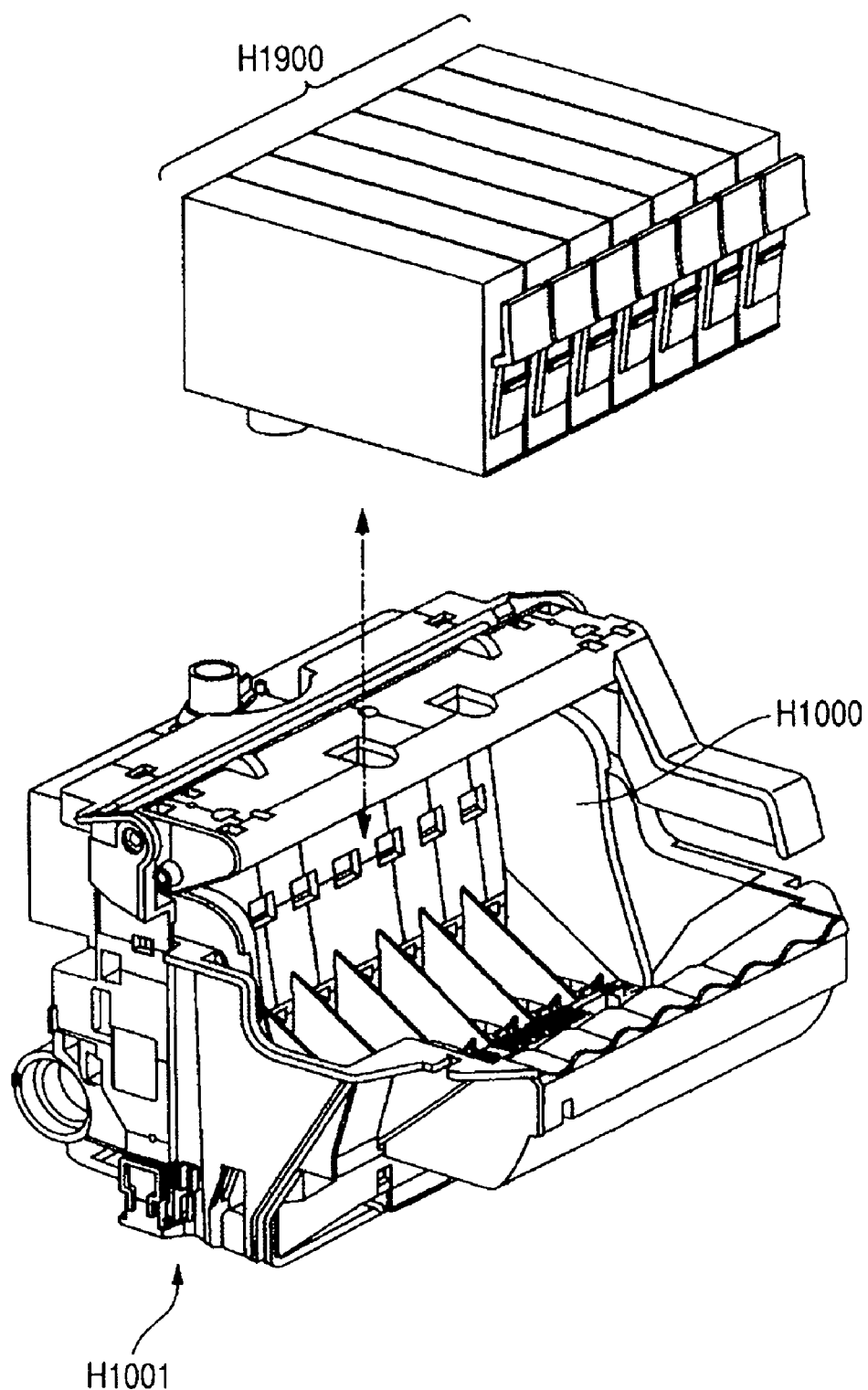
FIG. 13 is a perspective view showing a state in which an ink tank is mounted on a head cartridge.

FIG. 13 shows how the ink tanks H1900 are mounted on the head cartridge H1000. The recording apparatus forms an image by means of yellow, magenta, cyan, black, light magenta, light cyan, and green inks, so the ink tanks H1900 are independently prepared for seven colors. The ink in accordance with the present invention is used for at least one of the above inks. In addition, as shown in the figure, each ink tank is detachable to the head cartridge H1000. The ink tanks H1900 can be detached in a state where the head cartridge H1000 is mounted on the carriage M4000.

Figure 14:
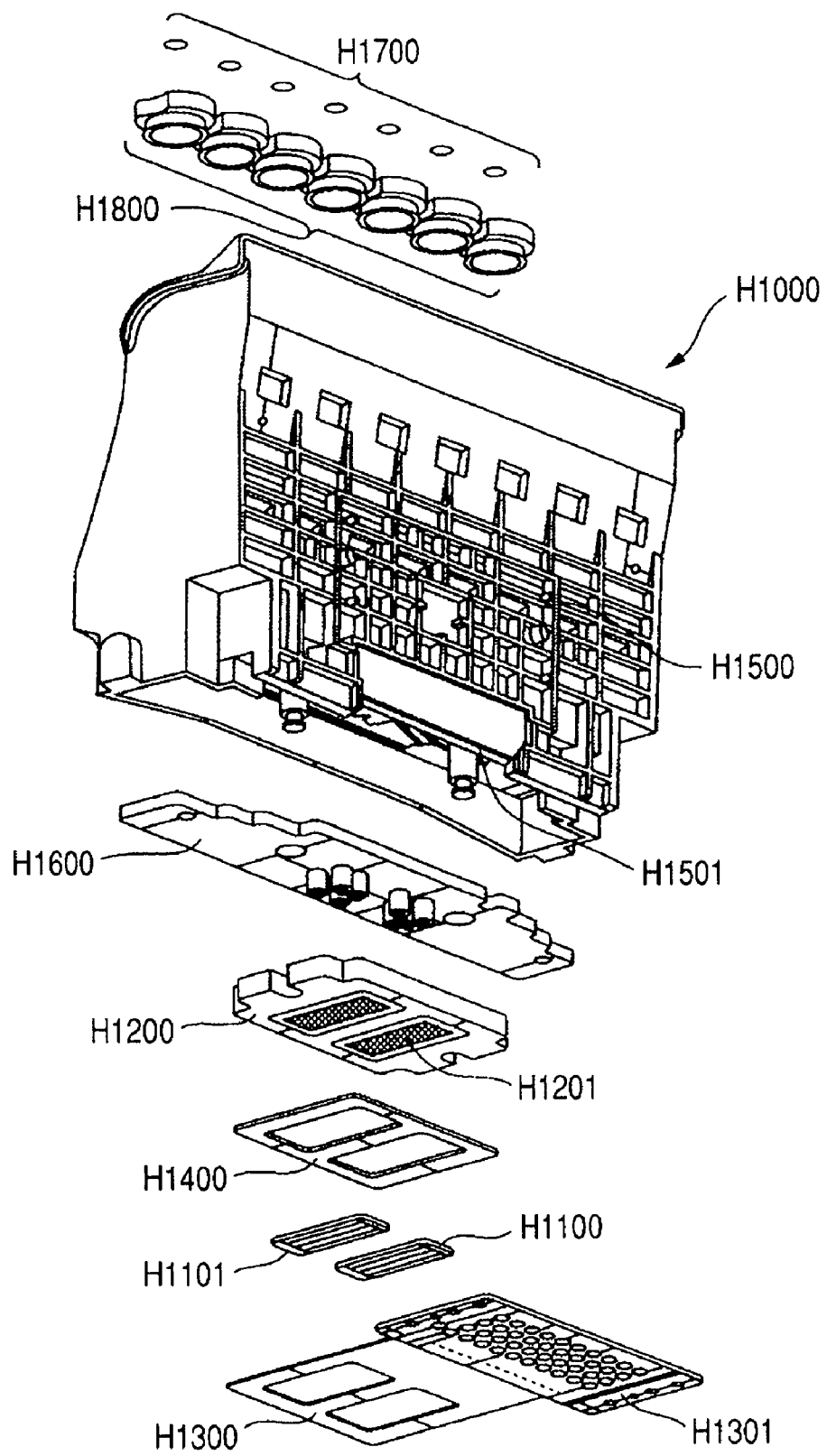
FIG. 14 is an exploded perspective view of the head cartridge.

FIG. 14 shows an exploded perspective view of the head cartridge H1000. In the figure, the head cartridge H1000 includes a first recording element substrate H1100, a second recording element substrate H1101, a first plate H1200, a second plate H1400, an electric wiring substrate H1300, a tank holder H1500, a flow path forming member H1600, a filter H1700, and a seal rubber H1800.

Each of the first recording element substrate H1100 and the second recording element substrate H1101 is an Si substrate having multiple recording elements (nozzles) for ejecting ink formed on one surface by means of photolithography. Electric wiring made of Al or the like for supplying power to each recording element is formed by means of a film formation technique, and multiple ink flow paths corresponding to the individual recording elements are also formed by means of photolithography. Furthermore, ink supply ports for supplying ink to the multiple ink flow paths are formed so as to open on the rear surface.

Figure 15:
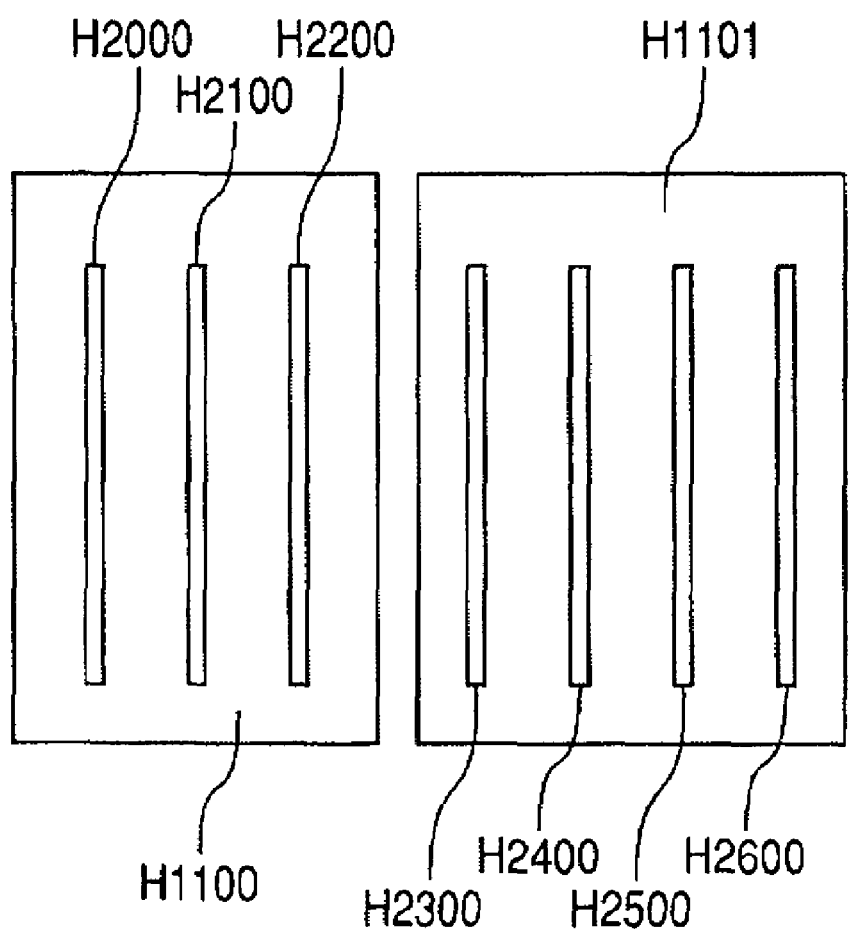
FIG. 15 is a front view showing a recording element substrate in the head cartridge.

FIG. 15 is an enlarged front view for explaining the constitution of each of the first recording element substrate H1100 and the second recording element substrate H1101. Reference symbols H2000 to H2600 denote recording element trains (which may hereinafter be also referred to as nozzle trains) corresponding to different ink colors. The first recording element substrate H1100 has nozzle trains for three colors: the nozzle train H2000 to which yellow ink is supplied, the nozzle train H2100 to which magenta ink is supplied, and the nozzle train H2200 to which cyan ink is supplied. The second recording element substrate H1101 has nozzle trains for four colors: the nozzle train H2300 to which light cyan ink is supplied, the nozzle train H2400 to which black ink is supplied, the nozzle train H2500 to which orange ink is supplied, and the nozzle train H2600 to which light magenta ink is supplied.

Each nozzle train is constituted by 768 nozzles arranged at an interval of 1,200 dpi (dot/inch; reference value) in the conveying direction of a recording medium, and each nozzle ejects about 2 pl of ink. An opening area in each nozzle ejection port is set to about 100 $\mu m^2$. The first recording element substrate H1100 and the second recording element substrate H1101 are bonded and fixed to the first plate H1200 having formed thereon ink supply ports H1201 for supplying ink to the first recording element substrate H1100 and the second recording element substrate H1101.

The second plate H1400 having openings is also bonded and fixed to the first plate H1200. The second plate H1400 holds the electric wiring substrate H1300 in such a manner that the electric wiring substrate H1300, the first recording element substrate H1100, and the second recording element substrate H1101 are electrically connected.

The electric wiring substrate H1300 applies an electrical signal for causing each of the nozzles formed on the first recording element substrate H1100 and the second recording element substrate H1101 to eject ink. The electric wiring substrate H1300 has: electric wiring corresponding to each of the first recording element substrate H1100 and the second recording element substrate H1101; and an external signal input terminal H1301 which is positioned at an end portion of the electric wiring to receive an electrical signal from the recording apparatus main body. The external signal input terminal H1301 is positioned and fixed to the back surface side of the tank holder H1500.

Meanwhile, the flow path forming member H1600 is fixed by means of, for example, ultrasonic welding to the tank holder H1500 for holding the ink tanks H1900. Thus, an ink flow path H1501 passing from the ink tanks H1900 to the first plate H1200 is formed.

The filter H1700 is arranged at an end portion on the ink tank side of the ink flow path H1501 engaged with the ink tanks H1900, so the filter H1700 prevents dust from entering from the outside. The seal rubber H1800 is mounted on the portion at which the ink flow path H1501 is engaged with the ink tanks H1900 to prevent ink from evaporating from the portion.

Furthermore, as described above, the head cartridge H1000 is constituted by connecting through bonding or the like a tank holder portion constituted by the tank holder H1500, the flow path forming member H1600, the filter H1700, and the seal rubber H1800, and the recording head portion H1001 constituted by the first recording element substrate H1100, the second recording element substrate H1101, the first plate H1200, the electric wiring substrate H1300, and the second plate H1400.

Incidentally, the above description has been made by taking, as an example of an embodiment of a recording head, a recording head according to a bubble jet (registered trademark) system that performs recording by means of an electrothermal converter (recording element) for generating a thermal energy for causing ink to effect film boiling depending on an electrical signal.

The representative structure and working principle are preferably based on the basic principle disclosed in U.S. Pat.

Nos. 4,723,129 and 4,740,796. This principle is applicable to an on-demand or continuous type. It is particularly effective when applied to an on-demand type, where at least one driving signal is transmitted to an electrothermal converter placed in a position corresponding to each of a sheet and liquid passage by which the liquid (ink) is held to rapidly heat the ink to a temperature beyond the nucleate boiling temperature, the converter being sufficiently generating heat to cause film boiling on the heated recording head surface, with the result that the bubbles are formed in the liquid (ink) in one-to-one correspondence to the signal. The liquid (ink) is ejected through an ejection port by the actions of the bubbles growing and contracting to form at least one droplet. The pulsed signal is more preferable, because it can immediately and adequately cause growth and contract of the bubbles to achieve ink eject of high response.

Further, an example of a second embodiment of an ink jet recording apparatus utilizing a mechanical energy includes an on-demand ink jet recording head including: a nozzle forming substrate having multiple nozzles; a pressure generating element arranged so as to be opposed to the nozzles and composed of a piezoelectric material and a conductive material; and ink filling the surroundings of the pressure generating element, in which the pressure generating element is displaced by an applied voltage to eject a small ink droplet from a nozzle.

Moreover, the ink jet recording apparatus is not limited to such apparatus as described above in which a head and an ink tank are separated, and may be one in which a head and an ink tank are integrally formed into one body so that they are unseparable. In addition, the ink tank may be separably or unseparably integrated with the head to be mounted on a carriage, or may be mounted at a fixing portion of an apparatus to supply ink to a recording head through an ink supply member such as a tube. When the ink tank is provided with a constitution for applying a preferable negative pressure to the recording head, an absorber may be arranged in an ink storage portion of the ink tank, or the ink tank may have a flexible ink storage bag and a spring portion for applying an urging force to increase the internal volume of the bag. The recording apparatus may adopt a serial recording method as described above, or may be in the form of a line printer obtained by aligning recording elements over the range corresponding to the entire width of a recording medium.

<Ink of Another Embodiment>

The present inventors have studied a large number of combinations of various coloring materials and various auxiliary additives, to thereby find a basic technical concept for improving the light fastness of a recorded article. That is, the first task of the present invention can be attained by utilizing a synergistic effect of a main coloring material and an auxiliary additive that are similar in molecular structure to each other.

That is, a recorded article obtained by means of an ink comprising a coloring material having a main color-developing structure portion and an auxiliary structure portion bonded to the main color-developing structure portion; and a compound comprising a main skeleton similar in structure to the auxiliary structure portion of the coloring material and a carboxyl group, and having no absorption region in a visible region has good light fastness. This is embodied as the above-described first aspect of the present invention.

The term "main color-developing structure portion" herein employed refers to a site in the structure of a coloring material containing a large number of chromophores. The term "auxiliary structure portion" herein employed refers to a site other than the site containing a large number of chromophores. To be specific, for example, in the case of the compound represented by the general formula (I) or a salt thereof, the main color-developing structure portion is the anthrapyridone skeleton, and the auxiliary structure portion is a substituent bonded to the anthrapyridone skeleton.

EXAMPLES

Hereinafter, the present invention will be described in more detail by way of examples and comparative examples. However, the following examples are included herein for purposes of illustration only and are not intended to be limiting of the present invention. Unless otherwise stated, the amounts of ink components in examples and comparative examples are represented in "part by mass" units. In the following examples, description will be given by taking as an example an ink to be used for an ink jet recording method requested to have more exact characteristics than those of generally used ink. However, it will be apparent to one skilled in the art from the following description of examples that the use of general ink can of course provide high light fastness according to the first task described above.

<Preparation of Coloring Material which is a Compound Represented by General Formula (I) or a Salt Thereof>

Compound (1) shown below, sodium carbonate, and ethyl benzoyl acetate were allowed to react to one another in xylene, and the reactant was filtered and washed. To the resultant, were sequentially added with m-amino acetanilide, copper acetate, and sodium carbonate in N,N-dimethylformamide to carry out a reaction, and the reactant was filtered and washed. The resultant was sulfonated in fuming sulfuric acid, and the resultant was filtered and washed. The resultant was subjected to a condensation reaction with cyanuric chloride in the presence of sodium hydroxide. Anthranilic acid was added to the reaction liquid to carry out a condensation reaction in the presence of sodium hydroxide. The resultant was filtered and washed to prepare Exemplified Compound A shown below.

Compound (1)

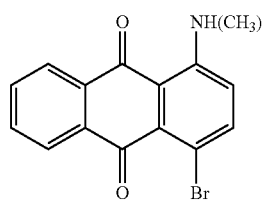

-continued

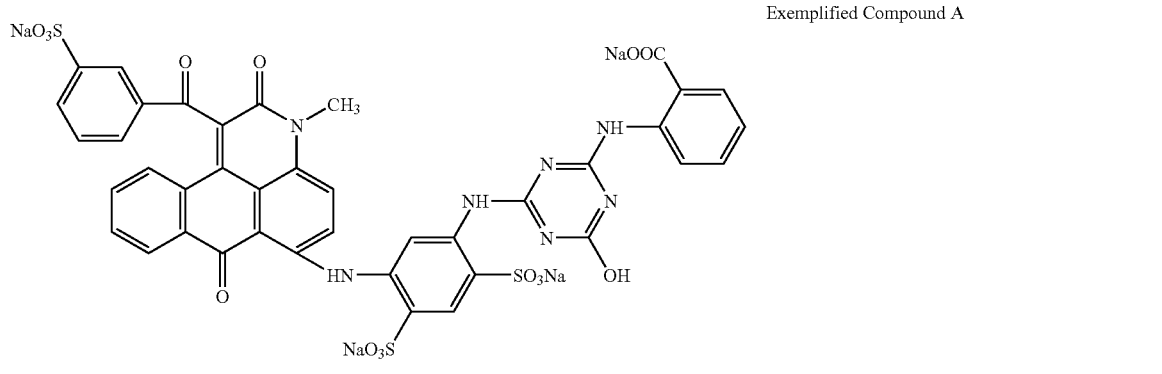

Exemplified Compound A

<Preparation of Compound Represented by General Formula (II)>

The compound represented by the general formula (II) can be prepared by means of a conventionally known method. Here, an example of a method of synthesizing Exemplified Compound B shown below as an example of the compound represented by the general formula (II) will be described.

An aqueous solution of anthranilic acid was added to a suspension of cyanuric chloride, and the mixture was subjected to a condensation reaction in the presence of sodium hydroxide to prepare a condensate having two molecules of anthranilic acid condensed with one molecule of cyanuric chloride. Further, sodium hydroxide was added thereto and the mixture was heated to carry out a hydrolysis reaction. Then, the mixture was filtrated and washed to prepare Exemplified Compound B shown below.

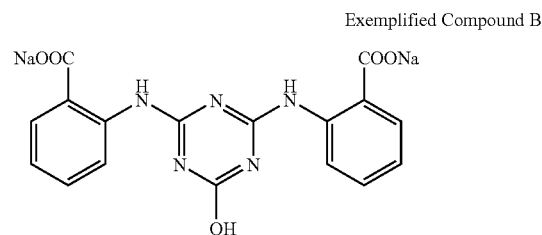

Exemplified Compound B

<Preparation of Ink>

The respective components shown in each of Tables 3 to 5 below were mixed and sufficiently stirred. After that, the resultant mixture was pressure filtered through a filter having a pore size of 0.2 μm under pressure to prepare each of inks 1 to 26. Incidentally, Tables 3 to 5 below also show the pH values of the respective inks. The pH was adjusted by means of pure water added with sodium hydroxide or sulfuric acid.

TABLE 3

| Components | Ink No. | | | | | | | | |
|---|---|---|---|---|---|---|---|---|---|
| | 1 | 2 | 3 | 4 | 5 | 6 | 7 | 8 | 9 |
| Exemplified Compound A | 5.00 | 5.00 | 5.00 | 5.00 | 5.00 | 5.00 | 5.00 | 5.00 | 5.00 |
| Exemplified Compound B | 2.10 | 2.00 | 1.00 | 0.62 | 0.62 | 0.42 | 0.38 | 0.39 | 0.23 |
| Glycerin | 10.00 | 10.00 | 10.00 | 10.00 | 10.00 | 10.00 | 10.00 | 10.00 | 10.00 |
| Ethylene glycol | 10.00 | 10.00 | 10.00 | 10.00 | 10.00 | 10.00 | 10.00 | 10.00 | 10.00 |
| Urea | 5.00 | 5.00 | 5.00 | 5.00 | 5.00 | 5.00 | 5.00 | 5.00 | 5.00 |
| N-methyl-2-pyrrolidone | 5.00 | 5.00 | 5.00 | 5.00 | 5.00 | 5.00 | 5.00 | 5.00 | 5.00 |
| Acetylenol E-100 (*1) | 1.00 | 1.00 | 1.00 | 1.00 | 1.00 | 1.00 | 1.00 | 1.00 | 1.00 |
| Pure water (*2) | 61.90 | 62.00 | 63.00 | 63.38 | 63.38 | 63.58 | 63.62 | 63.61 | 63.77 |
| pH | 11.0 | 10.5 | 9.0 | 8.0 | 7.7 | 8.6 | 7.2 | 6.9 | 9.0 |

(*1) Acetylene glycol-ethylene oxide adduct (surfactant) (manufactured by Kawaken Fine Chemicals Co., Ltd.)

(*2) The sum of pure water and sodium hydroxide, the sum of pure water and sulfuric acid, or pure water.

TABLE 4

| Components | Ink No. | | | | | | | | |
|---|---|---|---|---|---|---|---|---|---|
| | 10 | 11 | 12 | 13 | 14 | 15 | 16 | 17 | 18 |
| Exemplified Compound A | 5.00 | 5.00 | 5.00 | 5.00 | 5.00 | 5.00 | 5.00 | 5.00 | 5.00 |
| Exemplified Compound B | 0.23 | 0.23 | 0.18 | 0.18 | 0.18 | 0.18 | 0.14 | 0.14 | 0.11 |
| Glycerin | 10.00 | 10.00 | 10.00 | 10.00 | 10.00 | 10.00 | 10.00 | 10.00 | 10.00 |
| Ethylene glycol | 10.00 | 10.00 | 10.00 | 10.00 | 10.00 | 10.00 | 10.00 | 10.00 | 10.00 |
| Urea | 5.00 | 5.00 | 5.00 | 5.00 | 5.00 | 5.00 | 5.00 | 5.00 | 5.00 |
| N-methyl-2-pyrrolidone | 5.00 | 5.00 | 5.00 | 5.00 | 5.00 | 5.00 | 5.00 | 5.00 | 5.00 |
| Acetylenol E-100 (*1) | 1.00 | 1.00 | 1.00 | 1.00 | 1.00 | 1.00 | 1.00 | 1.00 | 1.00 |
| Pure water (*2) | 63.77 | 63.77 | 63.82 | 63.82 | 63.82 | 63.82 | 63.86 | 63.86 | 63.89 |
| pH | 7.1 | 6.0 | 8.3 | 7.0 | 6.5 | 6.0 | 7.0 | 6.0 | 8.3 |

(*1) Acetylene glycol-ethylene oxide adduct (surfactant)
(*2) The sum of pure water and sodium hydroxide, the sum of pure water and sulfuric acid, or pure water.

TABLE 5

| Components | Ink No. | | | | | | | |
|---|---|---|---|---|---|---|---|---|
| | 19 | 20 | 21 | 22 | 23 | 24 | 25 | 26 |
| Exemplified Compound A | 5.00 | 5.00 | 5.00 | 5.00 | 5.00 | 5.00 | 5.00 | 5.00 |
| Exemplified Compound B | 0.11 | 0.09 | 0.09 | 0.06 | 0.04 | 0.04 | 0.02 | 0.00 |
| Glycerin | 10.00 | 10.00 | 10.00 | 10.00 | 10.00 | 10.00 | 10.00 | 10.00 |
| Ethylene glycol | 10.00 | 10.00 | 10.00 | 10.00 | 10.00 | 10.00 | 10.00 | 10.00 |
| Urea | 5.00 | 5.00 | 5.00 | 5.00 | 5.00 | 5.00 | 5.00 | 5.00 |
| N-methyl-2-pyrrolidone | 5.00 | 5.00 | 5.00 | 5.00 | 5.00 | 5.00 | 5.00 | 5.00 |
| Acetylenol E-100 (*1) | 1.00 | 1.00 | 1.00 | 1.00 | 1.00 | 1.00 | 1.00 | 1.00 |
| Pure water (*2) | 63.89 | 63.91 | 63.91 | 63.94 | 63.96 | 63.96 | 63.98 | 64.00 |
| pH | 7.0 | 6.5 | 5.2 | 5.0 | 6.0 | 4.0 | 8.0 | 7.0 |

(*1) Acetylene glycol-ethylene oxide adduct (surfactant)
(*2) The sum of pure water and sodium hydroxide, the sum of pure water and sulfuric acid, or pure water.

<Evaluation>

Each of the inks thus prepared was filled into a portion to be filled with magenta ink of a thermal ink jet printer (trade name: PIXUS 950i; manufactured by CANON Inc.) for ejecting an ink droplet by applying thermal energy to ink; printing was effected; and evaluation was performed for the following items.

(1) Light Fastness

Printing was performed by means of the above-mentioned printer at a recording density of 2,400 dpi×1,200 dpi, with an ink ejection amount of 2.5 pl, and at 50% duty on a recording medium (trade name: PR-101; manufactured by CANON Inc.), in an environment of a temperature of 23° C. and a relative humidity of 55%. The resulting recorded article was naturally dried for 24 hours at a temperature of 23° C. and a relative humidity of 55%. Then, the recorded article was set in a low temperature xenon weather meter (trade name: XL-75C; manufactured by Suga Test Instruments Co., Ltd.) and exposed to the conditions of a radiation intensity of 100 kLux, an in-tank temperature of 23° C., and a relative humidity of 55% for one week. The optical densities of each recorded article before and after the test were measured by means of a spectrophotometer (Spectrolino (trade name); manufactured by Gretag Macbeth) with a light source of D50 at a visual field of 2° and a residual ratio was calculated from the optical densities before and after the test. The evaluation standard for light fastness is as follows. Table 6 shows the results of the evaluation.

A: Light fastness is improved as compared to that of the ink No. 26 that does not contain Exemplified Compound B.

B: Light fastness is comparable to that of the ink No. 26 that does not contain Exemplified Compound B.

C: Light fastness deteriorates as compared to that of the ink No. 26 that does not contain Exemplified Compound B.

TABLE 6

| | | Ink No. | Light fastness |
|---|---|---|---|
| Example No. | 1 | 1 | A |
| | 2 | 2 | A |
| | 3 | 3 | A |
| | 4 | 4 | A |
| | 5 | 6 | A |
| | 6 | 7 | A |
| | 7 | 9 | A |
| | 8 | 10 | A |
| | 9 | 12 | A |
| | 10 | 13 | A |
| | 11 | 14 | A |
| | 12 | 15 | A |
| | 13 | 16 | A |
| | 14 | 17 | A |
| | 15 | 18 | A |
| | 16 | 19 | A |
| | 17 | 20 | A |
| | 18 | 21 | A |
| | 19 | 22 | A |
| | 20 | 23 | A |
| | 21 | 24 | A |
| | 22 | 25 | A |
| Comparative Example No. | 1 | 26 | B |

It can be seen from Table 6 above that a recorded article obtained by means of the ink containing Exemplified Compound B has higher light fastness than that of a recorded article obtained by means of ink containing no exemplified compound.

(2) Ink Stability during Low Temperature Storage

Each of the above inks was put into a colorless closed vessel made of glass and then was left to stand in an environment of a temperature of 5° C. for 2 hours to visually observe generation of precipitate. The evaluation standard for ink stability at the time of storage at a low temperature is as follows. Table 7 shows the results.

A: No precipitate is generated, or a very slight amount of precipitate is generated but using the ink to operate a printer at a low temperature poses no practical problem.

B: Precipitate is generated and using the ink to operate a printer at a low temperature may pose a problem.

TABLE 7

|  |  | Ink | Ink stability during low temperature storage |
|---|---|---|---|
| Example No. | 23 | 4 | A |
|  | 24 | 5 | B |
|  | 25 | 6 | A |
|  | 26 | 7 | A |
|  | 27 | 8 | B |
|  | 28 | 9 | A |
|  | 29 | 10 | A |
|  | 30 | 12 | A |
|  | 31 | 13 | A |
|  | 32 | 14 | A |
|  | 33 | 15 | B |
|  | 34 | 16 | A |
|  | 35 | 17 | A |
|  | 36 | 18 | A |
|  | 37 | 19 | A |
|  | 38 | 20 | A |
|  | 39 | 21 | A |
|  | 40 | 22 | A |
|  | 41 | 23 | A |
|  | 42 | 24 | A |
|  | 43 | 25 | A |
| Comparative Example No. | 2 | 26 | A |

It can be seen from Table 7 above that the ink stability at the time of storage at a low temperature correlates with the content (mass %) of Exemplified Compound B and the pH of ink.

Figure 6:
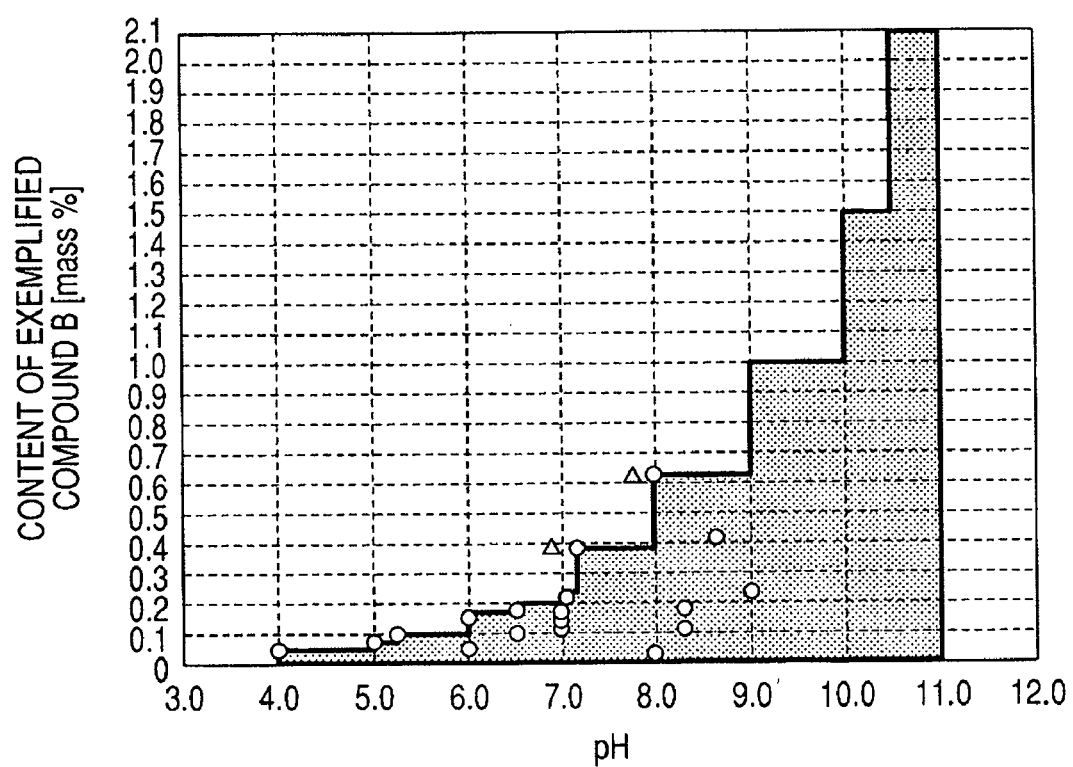
FIG. 6 is a graphical representation showing a preferable range for obtaining excellent ink stability at the time of storage at a low temperature and showing results of evaluation of ink stability at the time of storage at a low temperature.

In FIG. 6, the axis of ordinate indicates the content (mass %) of Exemplified Compound B shown above with respect to the total mass of ink, and the axis of abscissa indicates the pH of the ink at 25° C. FIG. 6 shows a preferable range for obtaining excellent ink stability at the time of storage at a low temperature and shows results of evaluation of ink stability at the time of storage at a low temperature. Incidentally, the shaded portion in FIG. 6 shows the preferable range, and symbol o corresponds to A of the evaluation standard and symbol Δ corresponds to B of the evaluation standard.

(3) Initial Ejection Property Immediately after Printing

After the above printer had been left in an environment of a temperature of 23° C. and a relative humidity of 55% for 5 hours, the respective ink was ejected from a predetermined nozzle. Then, printing was suspended for 5 seconds, and the ink was ejected again from the predetermined nozzle to perform printing on a recording medium (trade name: HR-101; manufactured by CANON Inc.). The printing quality of the resulting recorded article was visually observed. The evaluation standard for initial ejection property immediately after printing is as follows. Table 8 shows the results of the evaluation.

AA: Normal printing can be performed.
A: Printing is slightly disturbed but is acceptable.
B: Ejection may not be performed, or printing may be disturbed.

TABLE 8

|  |  | Ink No. | Initial ejection property immediately after printing |
|---|---|---|---|
| Example No. | 44 | 1 | B |
|  | 45 | 2 | A |
|  | 46 | 3 | AA |
|  | 47 | 6 | AA |

TABLE 8-continued

|  |  | Ink No. | Initial ejection property immediately after printing |
|---|---|---|---|
|  | 48 | 9 | AA |
|  | 49 | 12 | AA |
|  | 50 | 13 | AA |
|  | 51 | 18 | AA |
|  | 52 | 19 | AA |
|  | 53 | 20 | AA |
|  | 54 | 23 | AA |
|  | 55 | 25 | AA |
| Comparative Example No. | 3 | 26 | AA |

It can be seen from Table 8 above that the initial ejection property immediately after printing has no problem in actual use when the content (mass %) of Exemplified Compound B is 2.0 mass % or less, and that the property is particularly good when the content is 1.0 mass % or less.

Figure 7:
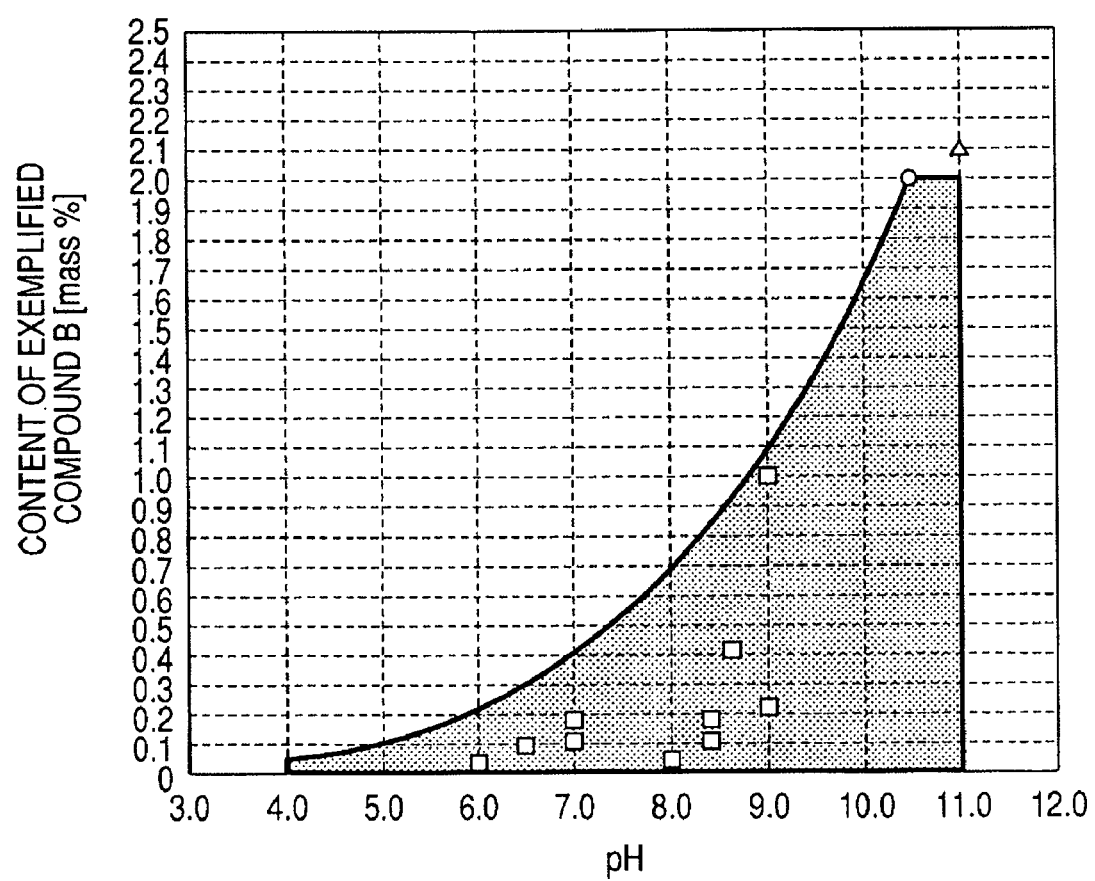
FIG. 7 is a graphical representation showing a preferable range for obtaining excellent initial ejection property immediately after printing and showing results of evaluation of initial ejection property immediately after printing.

In FIG. 7, the axis of ordinate indicates the content (mass %) of Exemplified Compound B shown above with respect to the total mass of ink, and the axis of abscissa indicates the pH of the ink at 25° C. FIG. 7 shows a preferable range for obtaining excellent initial ejection property immediately after printing and shows results of evaluation of initial ejection property immediately after printing. The shaded portion in FIG. 7 shows the preferable range, and symbol □ corresponds to AA of the evaluation standard, symbol ○ corresponds to A of the evaluation standard, and symbol Δ corresponds to B of the evaluation standard.

(4) Image Quality

Printing was performed by means of the above printer at a recording density of 2,400 dpi×1,200 dpi with an ink ejection amount of 2.5 pl at various duties ranging from 5% to 100% on a recording medium (trade name: PR-101; manufactured by CANON Inc.) at a temperature of 23° C. and a relative humidity of 55%. The resulting recorded article was visually observed and evaluated for image quality according to the following standard. Table 9 shows the results of the evaluation.

A: No change in image density of a recorded article is generated, or a change in image density of the recorded article is extremely small as compared to the ink 26 that does not contain Exemplified Compound B. That is, the difference in optical density, which is measured by means of a spectrophotometer (Spectrolino (trade name); manufactured by Gretag Macbeth) with a light source of D50 and at a visual field of 2°, between recorded articles obtained by performing printing by means of ink that contains Exemplified Compound B and ink that does not contain Exemplified Compound B at the same duty is 0.1 or less.

B: A change in image density of a recorded article is noticed as compared to the ink 26 that does not contain Exemplified Compound B. That is, the difference in optical density, which is measured by means of a spectrophotometer (Spectrolino (trade name); manufactured by Gretag Macbeth) with a light source of D50 at a visual field of 2°, between recorded articles obtained by performing printing by means of ink that contains Exemplified Compound B and ink that does not contain Exemplified Compound B at the same duty is more than 0.1.

TABLE 9

| | | Ink No. | Image quality |
|---|---|---|---|
| Example No. | 56 | 1 | B |
| | 57 | 2 | B |
| | 58 | 3 | B |
| | 59 | 4 | B |
| | 60 | 6 | A |
| | 61 | 7 | A |
| | 62 | 9 | A |
| | 63 | 10 | A |
| | 64 | 12 | A |
| | 65 | 13 | A |
| | 66 | 14 | A |
| | 67 | 15 | A |
| | 68 | 16 | A |
| | 69 | 17 | A |
| | 70 | 18 | A |
| | 71 | 19 | A |
| | 72 | 20 | A |
| | 73 | 21 | A |
| | 74 | 22 | A |
| | 75 | 23 | A |
| | 76 | 24 | A |
| | 77 | 25 | A |
| Comparative Example No. | 4 | 26 | A |

It can be seen from Table 9 above that when the content (mass %) of Exemplified Compound B is 0.42 mass % or less, the image quality is substantially identical to that of an image obtained by means of ink that does not contain Exemplified Compound B.

Figure 8:
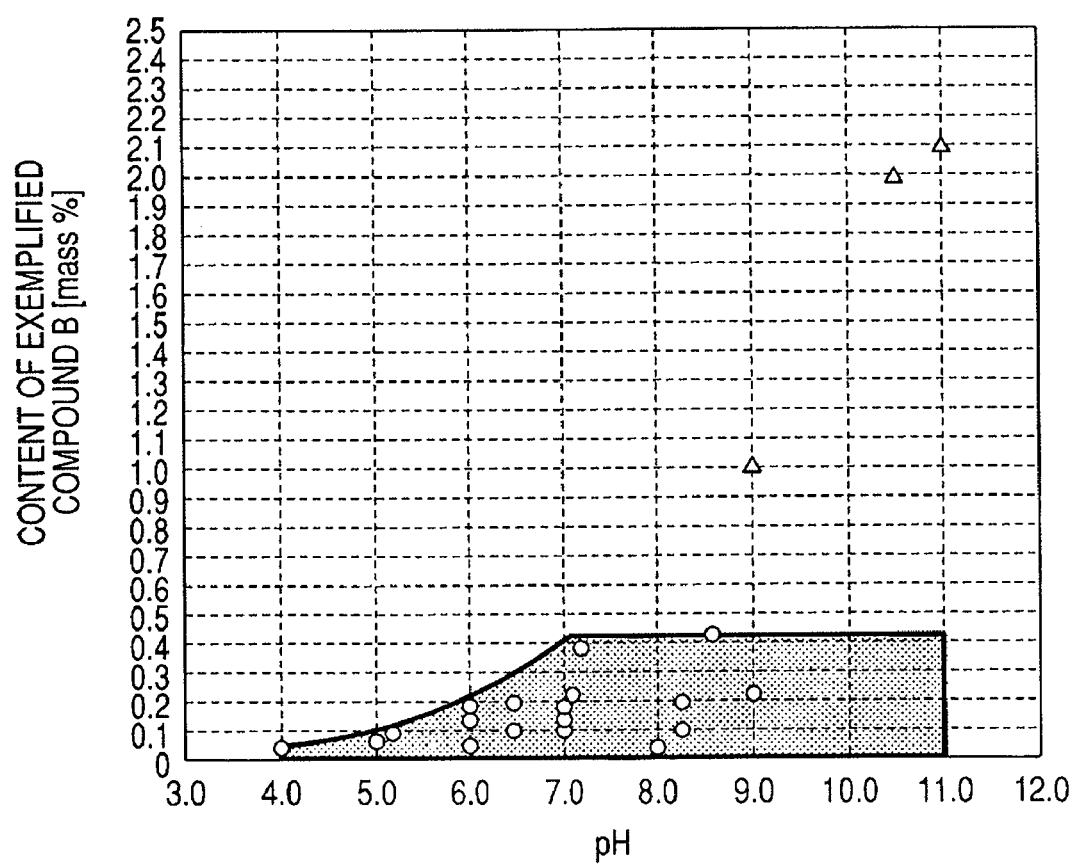
FIG. 8 is a graphical representation showing a preferable range for obtaining excellent image quality and showing results of evaluation of image quality.

In FIG. 8, the axis of ordinate indicates the content (mass %) of Exemplified Compound B above with respect to the total mass of ink, and the axis of abscissa indicates the pH of the ink at 25° C. FIG. 8 shows a preferable range for obtaining excellent image quality and shows results of evaluation of image quality. The shaded portion in FIG. 8 shows the preferable range, and symbol o corresponds to A of the evaluation standard and symbol Δ corresponds to B in the evaluation standard.

(5) Printing Continuability

Continuous printing was performed by means of the above printer on a recording medium (trade name: Recycle Paper EN-100; manufactured by CANON Inc.) under the conditions of a temperature of 23° C. and a relative humidity of 55% by applying 1×10$^8$ pulses per nozzle. After that, the printer was left in the state for 12 hours, and then additional printing was performed. Then, the recorded articles before and after the continuous printing were compared. The evaluation standard for printing continuability is as follows. Table 10 shows the results of the evaluation.

AA: No change occurs as compared to an initial image.

A: A slight change may occur as compared to an initial image but is acceptable.

B: Thin spots may be generated in a recorded article before the completion of the continuous printing.

TABLE 10

| | | Ink No. | Printing continuability |
|---|---|---|---|
| Example No. | 78 | 9 | AA |
| | 79 | 12 | AA |
| | 80 | 13 | B |
| | 81 | 16 | A |
| | 82 | 18 | AA |
| | 83 | 19 | AA |

TABLE 10-continued

| | | Ink No. | Printing continuability |
|---|---|---|---|
| | 84 | 20 | AA |
| | 85 | 23 | AA |
| | 86 | 25 | AA |
| Comparative Example No. | 5 | 26 | AA |

It can be seen from Table 10 above that the printing continuability correlates with the content (mass %) of Exemplified Compound B and the pH of ink.

Figure 9:
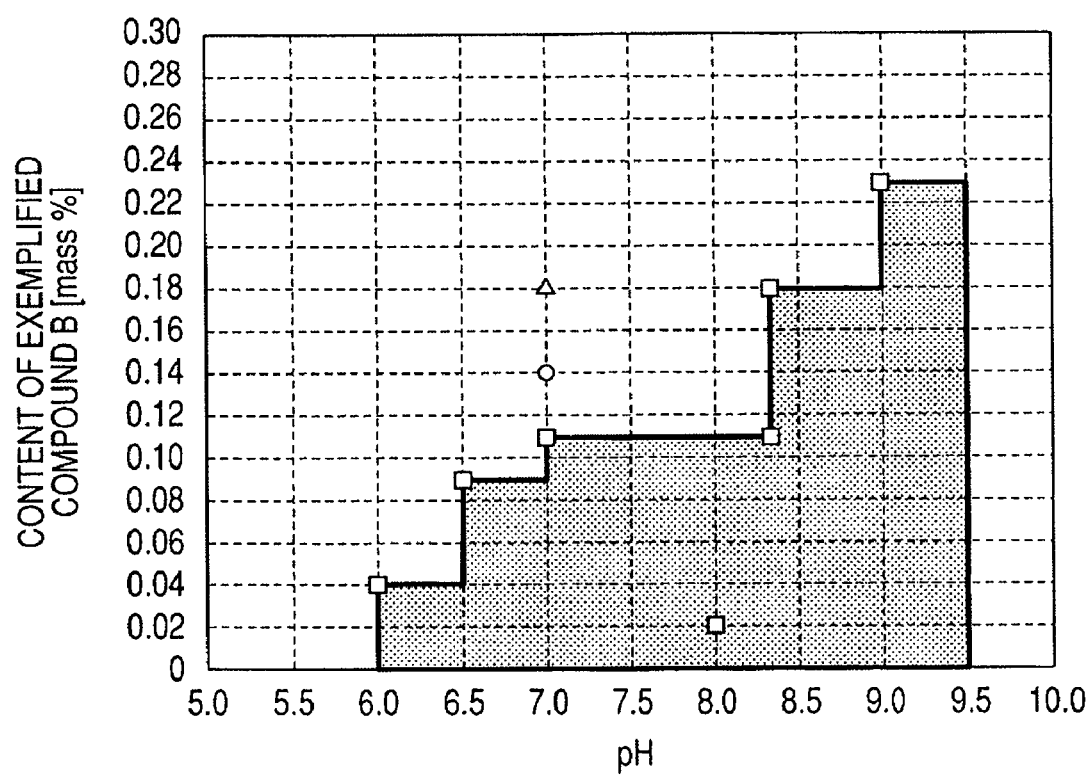
FIG. 9 is a graphical representation showing a preferable range for obtaining excellent printing continuability and showing results of evaluation of printing continuability.

In FIG. 9, the axis of ordinate indicates the content (mass %) of Exemplified Compound B shown above with respect to the total mass of ink, and the axis of abscissa indicates the pH of the ink at 25° C. FIG. 9 shows a preferable range for obtaining excellent printing continuability and shows results of evaluation of printing continuability. The shaded portion of FIG. 9 shows the preferable range, and symbol □ corresponds to AA of the evaluation standard, symbol o corresponds to A of the evaluation standard, and symbol Δ corresponds to B of the evaluation standard.

This application claims priority from Japanese Patent Application Nos. 2004-196452 filed Jul. 2, 2004 and 2005-192192 filed Jun. 30, 2005, which are hereby incorporated by reference herein.

What is claimed is:

1. An ink jet ink comprising at least a coloring material comprising a compound represented by the general formula (I) or a salt thereof and a compound represented by the general formula (II):

General formula (I)

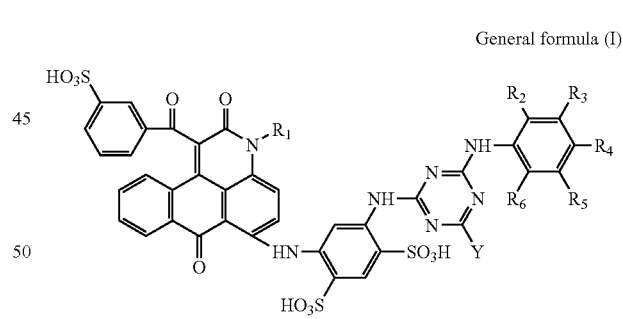

wherein $R_1$ represents a hydrogen atom, an alkyl group, a hydroxy lower alkyl group, a cyclohexyl group, a monoalkylaminoalkyl or dialkylaminoalkyl group, or a cyano lower alkyl group; and Y represents a chlorine atom, a hydroxyl group, an amino group, or a monoalkylamino or dialkylamino group which may have a substituent selected from the group consisting of a sulfonic group, a carboxyl group, and a hydroxyl group on an alkyl group; and $R_2$, $R_3$, $R_4$, $R_5$, and $R_6$ each in dependently represent a hydrogen atom, an alkyl group having 1 to 8 carbon atoms, a carboxyl group provided that $R_2$, $R_3$, $R_4$, $R_5$, and $R_6$ cannot simultaneously represent hydrogen atoms, General formula (II)

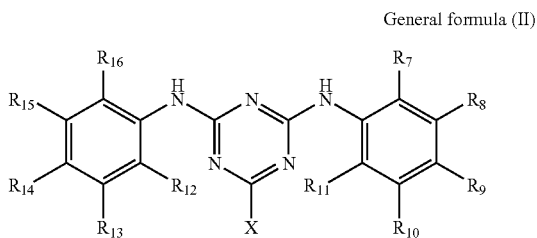

wherein $R_7$, $R_8$, $R_9$, $R_{10}$, $R_{11}$, $R_{12}$, $R_{13}$, $R_{14}$, $R_{15}$, and $R_{16}$ each independently represent a hydrogren atom, an alkyl group having 1 to 8 carbon atoms, or a carboxyl group or a salt thereof that $R_7$, $R_8$, $R_9$, $R_{10}$, $R_{11}$, $R_{12}$, $R_{13}$, $R_{14}$, $R_{15}$, and $R_{16}$ cannot simultaneously represent hydrogen atoms, and at least one of $R_7$, $R_8$, $R_9$, $R_{10}$, $R_{11}$, $R_{12}$, $R_{13}$, $R_{14}$, $R_{15}$, and $R_{16}$ represents a carboxyl group or a salt thereof; and X represents a chlorine atom, a hydroxyl group, an amino group, or a monoalkylamino or dialkylamino group which may have a substituent selected from the group consisting of a sulfonic group, a carboxyl group, and a hydroxyl group on an alkyl group.

2. The ink jet ink according to claim 1, wherein, in the general formula (II) one of $R_7$ and $R_{11}$ represents a carboxyl group or a salt thereof, and the other represents a hydrogen atom, and one of $R_{12}$ and $R_{16}$ represents a carboxyl group or a salt thereof, and the other represents a hydrogen atom, and each of $R_8$, $R_9$, $R_{10}$, $R_{13}$, $R_{14}$, and $R_{15}$ represents a hydrogen atom, and X represents a hydroxyl group.

3. The ink jet ink according to claim 1, wherein a pH of the ink jet ink at 250° C. and a content (mass %) of the compound represented by the general formula (II) with respect to a total mass of the ink jet ink satisfy the following relational equation (1): (Content (mass %) of compound represented by general formula (II)) $\leq 0.00015 \times (pH\ of\ ink)^{4.05}$ wherein the pH is 4.0 or more and 11.0 or less.

4. The ink jet ink according to claim 1, wherein the ink jet ink has a pH of 4.0 or more and 11.0 or less at 25° C., and wherein the pH and the content (mass %) of the compound represented by the general formula (II) with respect to the total mass of the ink jet ink satisfy any one of the following relationships (a) to (k):
(a) When the pH is 10.5 or more and 11.0 or less, the content is 2.10 mass % or less;
(b) When the pH is 10.0 or more and less than 10.5, the content is 1.50 mass % or less;
(c) When the pH is 9.0 or more and less than 10.0, the content is 1.00 mass % or less;
(d) When the pH is 8.0 or more and less than 9.0, the content is 0.62 mass % or less;
(e) When the pH is 7.2 or more and less than 8.0, the content is 0.38 mass % or less;
(f) When the pH is 7.0 or more and less than 7.2, the content is 0.23 mass % or less;
(g) When the pH is 6.5 or more and less than 7.0, the content is 0.18 mass % or less;
(h) When the pH is 6.0 or more and less than 6.5, the content is 0.14 mass % or less;
(i) When the pH is 5.2 or more and less than 6.0, the content is 0.09 mass % or less;
(j) When the pH is 5.0 or more and less than 5.2, the content is 0.06 mass % or less; and
(k) When the pH is 4.0 or more and less than 5.0, the content is 0.04 mass % or less.

5. The ink jet ink according to claim 3, wherein the pH of the ink jet ink at 25° C. and the content of the compound represented by the general formula (II) satisfy the relational equation (1) and the content of the compound represented by the general formula (II) is 2.00 mass % or less.

6. The ink jet ink according to claim 3, wherein the pH of the ink jet ink at 25° C. and the content of the compound represented by the general formula (II) satisfy the relational equation (1) and the content of the compound represented by the general formula (II) is 0.42 mass % or less.

7. The ink jet ink according to claim 1, wherein the ink jet ink has a pH of 6.0 or more and 9.5 or less at 25° C. and the pH and the content (mass %) of the compound represented by the general formula (II) with respect to the total mass of the ink jet ink satisfy any one of the following relationships (1) to (p):
(1) When the pH is 9.0 or more and 9.5 or less, the content is 0.23 mass % or less;
(in) When the pH is 8.3 or more and less than 9.0, the content is 0.18 mass % or less;
(n) When the pH is 7.0 or more and less than 8.3, the content is 0.11 mass % or less.
(o) When the pH is 6.5 or more and less than 7.0, the content is 0.09 mass % or less; and
(p) When the pH is 6.0 or more and less than 6.5, the content is 0.04 mass % or less.

8. An ink used for an ink set constituting of a plurality of inks, wherein at least one of the inks comprises the ink jet ink according to claim 1.

9. An ink set comprising a plurality of inks, which comprises the ink jet ink according to claim 1 as a magenta ink constituting the ink set.

10. An ink jet recording method, comprising ejecting an ink by an ink jet method, wherein the ink comprises the ink jet ink according to claim 1.

11. An ink cartridge, comprising an ink storage portion for storing ink, wherein the ink comprises the ink jet ink according to claim 1.

12. A recording unit, comprising an ink storage portion for storing ink and a recording head for ejecting the ink, wherein the ink comprises the ink jet ink according to claim 1.

13. An ink jet recording apparatus, comprising an ink storage portion for storing ink and a recording head for ejecting the ink, wherein the ink comprises the ink jet ink according to claim 1.

14. An ink comprising at least a coloring material having a main color-developing structure portion and an auxiliary structure portion bonded to the main color-developing structure portion; and a compound comprising a main skeleton similar in structure to the auxiliary structure portion of the coloring material and different in structure from the main color-developing structure portion of the coloring material and a carboxyl group, and having no absorption region in a visible region.

15. The ink according to claim 14, wherein the compound has a symmetrical structure.

* * * * *

UNITED STATES PATENT AND TRADEMARK OFFICE
CERTIFICATE OF CORRECTION

PATENT NO. : 7,285,159 B2
APPLICATION NO. : 11/322128
DATED : October 23, 2007
INVENTOR(S) : Yoshihide Aikawa et al.

It is certified that error appears in the above-identified patent and that said Letters Patent is hereby corrected as shown below:

ON THE TITLE PAGE:
At Item (75) Inventors,
"Yoshihide Aikawa, Kanagawa (JP); Kuniaki Fujimoto, Tokyo (JP); Shin-ichi Sato, Kanagawa (JP); Jun Yoshizawa, Tokyo (JP); Kunihiko Nakamura, Shizuoka (JP); Masanori Jinnou, Kanagawa (JP)"

should read

--Yoshihide Aikawa, Yokohama (JP); Kuniaki Fujimoto, Chofu (JP); Shin-ichi Sato, Kawasaki (JP); Jun Yoshizawa, Tokyo, (JP); Kunihiko Nakamura, Gotenba (JP); Masanori Jinnou, Yokohama (JP)--.

COLUMN 1:
Line 31, "to silver" should read --to a silver--.
Line 33, "to silver" should read --to a silver--.
Line 50, "of silver" should read --of a silver--.
Line 54, "to silver" should read --to a silver--.

COLUMN 2:
Line 8, "silver" should read --a silver--.
Line 35, "to silver" should read --to a silver--.
Line 56, "Another" should read --Other--.

COLUMN 13:
Line 59, "16,8," should read --168,--.

UNITED STATES PATENT AND TRADEMARK OFFICE
CERTIFICATE OF CORRECTION

PATENT NO. : 7,285,159 B2
APPLICATION NO. : 11/322128
DATED : October 23, 2007
INVENTOR(S) : Yoshihide Aikawa et al.

It is certified that error appears in the above-identified patent and that said Letters Patent is hereby corrected as shown below:

COLUMN 16:
Line 64, "less." should read --less;--.

COLUMN 25:
Line 15, "contract" should read --contraction--.
Line 31, "unseparable" should read --inseparable--.
Line 32, "unseparably" should read --inseparably--.

COLUMN 26:
Line 44, "resultant," should read --resultant--.

COLUMN 34:
Line 63, "in dependently" should read --independently--.

COLUMN 35:
Line 26, "that" should read --provided that--.

COLUMN 36:
Line 23, "(in)" should read --(m)--.
Line 31, "constituting of" should read --constituted of--.

Signed and Sealed this

Second Day of December, 2008

JON W. DUDAS
*Director of the United States Patent and Trademark Office*